(12) United States Patent
Hiramatsu et al.

(10) Patent No.: US 8,816,875 B2
(45) Date of Patent: *Aug. 26, 2014

(54) ELECTRONIC THERMOMETER

(75) Inventors: Hiroshi Hiramatsu, Kyoto (JP); Yasuo Fujita, Nagaokakyo (JP); Yoshihito Nakanishi, Suita (JP); Yoshihide Onishi, Dalian (CN); Daisuke Ishihara, Amagasaki (JP); Atsuko Fukui, Ashiya (JP); Masaki Tomioka, Kyoto (JP); Katsuyoshi Morita, Nagaokakyo (JP)

(73) Assignee: Omron Healthcare Co., Ltd., Kyoto-Shi (JP)

( * ) Notice: Subject to any disclaimer, the term of this patent is extended or adjusted under 35 U.S.C. 154(b) by 612 days.

This patent is subject to a terminal disclaimer.

(21) Appl. No.: 12/867,273

(22) PCT Filed: Feb. 17, 2009

(86) PCT No.: PCT/JP2009/052709
§ 371 (c)(1),
(2), (4) Date: Aug. 12, 2010

(87) PCT Pub. No.: WO2009/104608
PCT Pub. Date: Aug. 27, 2009

(65) Prior Publication Data
US 2010/0328090 A1    Dec. 30, 2010

(30) Foreign Application Priority Data

Feb. 22, 2008  (JP) ................................. 2008-041626
Dec. 2, 2008   (JP) ................................. 2008-307771

(51) Int. Cl.
| G08B 21/00 | (2006.01) |
| G08B 17/00 | (2006.01) |
| G01F 23/26 | (2006.01) |
| G01K 1/00  | (2006.01) |
| A61B 5/00  | (2006.01) |
| G01K 1/14  | (2006.01) |
| G01K 13/00 | (2006.01) |

(52) U.S. Cl.
CPC .............. G01K 13/002 (2013.01); G01K 1/146 (2013.01)
USPC .......... 340/687; 340/588; 340/589; 73/304 C; 374/100; 600/549

(58) Field of Classification Search
USPC ......................... 340/588–589, 687; 73/304 C
See application file for complete search history.

(56) References Cited

U.S. PATENT DOCUMENTS 5,453,644 A * 9/1995 Yap et al. ...................... 307/116
5,732,711 A * 3/1998 Fitzpatrick et al. ........... 600/549

(Continued)

FOREIGN PATENT DOCUMENTS

DE   197 37 150 A1   3/1998
JP   A-52-104176     9/1977

(Continued)

OTHER PUBLICATIONS

International Search report issued in Application No. PCT/JP2009/052709; Dated May 26, 2009 (With Translation).

(Continued)

Primary Examiner — Benjamin C Lee
Assistant Examiner — Adam Carlson
(74) Attorney, Agent, or Firm — Oliff PLC

(57) ABSTRACT

An electronic thermometer includes a hollow probe provided at its longitudinal tip with a temperature measuring unit having a temperature sensor for sensing a temperature, electrodes neighboring to the temperature sensor and arranged in the hollow of the probe, and a determining unit for determining whether temperature measuring unit is in appropriate contact with a measurement target portion of a user or not, based on a change in electrostatic capacity sensed using the electrodes.

11 Claims, 19 Drawing Sheets

(56) References Cited

U.S. PATENT DOCUMENTS

| | | | |
|---|---|---|---|
| 6,090,050 A | 7/2000 | Constantinides | |
| 6,358,216 B1 * | 3/2002 | Kraus et al. | 600/549 |
| 7,270,476 B2 | 9/2007 | Tokita et al. | |
| 7,314,310 B2 * | 1/2008 | Medero | 374/164 |
| 7,340,951 B2 * | 3/2008 | Nyce et al. | 73/304 C |
| 7,410,291 B2 * | 8/2008 | Koch | 374/163 |
| 7,461,550 B2 * | 12/2008 | Calabrese | 73/304 R |
| 7,996,579 B2 * | 8/2011 | Hahn et al. | 710/15 |
| 8,400,316 B2 * | 3/2013 | Hiramatsu et al. | 340/584 |
| 2008/0075143 A1 * | 3/2008 | Lampke-Honeyghan et al. | 374/164 |
| 2009/0302870 A1 * | 12/2009 | Paterson et al. | 324/670 |

FOREIGN PATENT DOCUMENTS

| | | |
|---|---|---|
| JP | A-57-163833 | 10/1982 |
| JP | A-61-500038 | 1/1986 |
| JP | A-61-182544 | 8/1986 |
| JP | A-05-235733 | 9/1993 |
| JP | Y2-06-027494 | 7/1994 |
| JP | Y2-07-050683 | 11/1995 |
| JP | A-10-112249 | 4/1998 |
| JP | A-2002-520109 | 7/2002 |
| JP | A-2005-235733 | 9/2005 |
| WO | WO 84/03378 A1 | 8/1984 |

OTHER PUBLICATIONS

Chinese Office Action issued in Application No. 200980106095.2; Dated Jan. 11, 2012 (With Translation).

May 28, 2013 Office Action issued in Japanese Application No. 2008-307771 (with English Translation).

German Office Action issued in German Patent Application No. 11 2009 000 408.3 dated Jan. 7, 2014 (w/ translation).

* cited by examiner

FIG.5
(A)
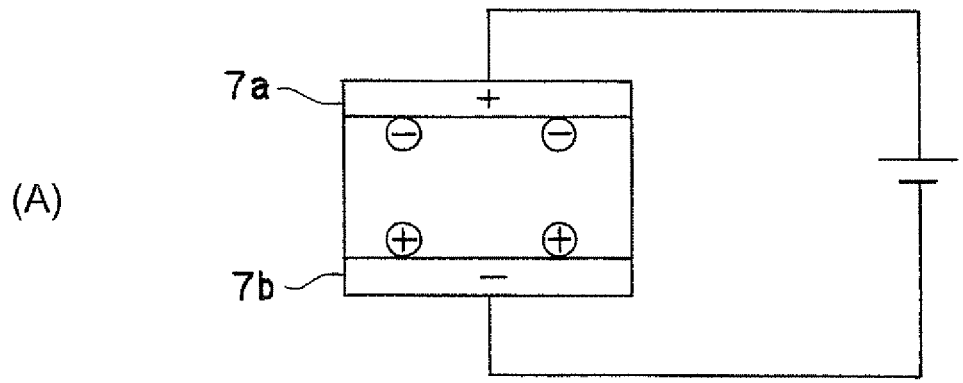
(B)
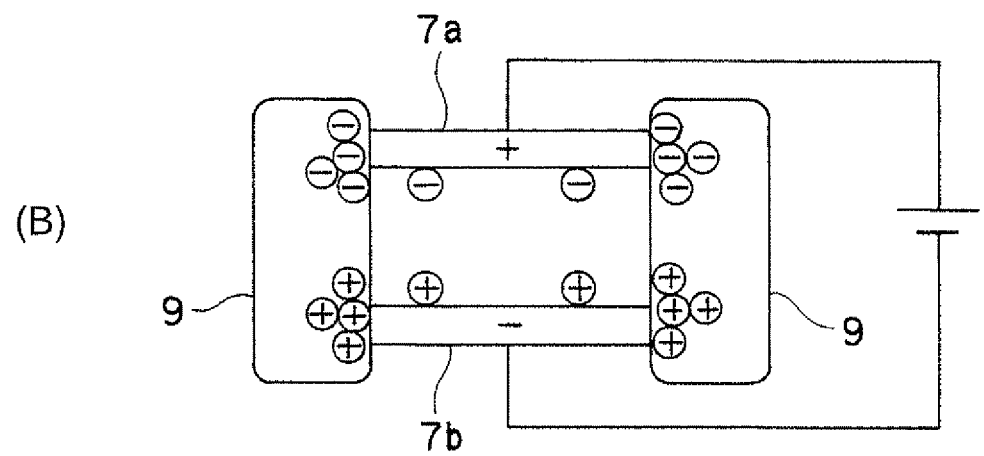

ELECTRONIC THERMOMETER

TECHNICAL FIELD

The present invention relates to an electronic thermometer.

BACKGROUND ART

Such an electronic thermometer has been known that can correctly measure a body temperature by determining whether a human body is in contact with a temperature sensor or not.

As such a kind of electronic thermometer, for example, a patent document 1 has disclosed an electronic thermometer that utilizes, for sensing a contact with a human body, a switch, a contact resistance, an electrostatic capacity, a humidity, a pressure (contact), a temperature comparison, a change in temperature and the like.

However, in the method that senses a contact state by determining whether a measurement target portion has pushed a switch or not, when a probe is in a contact position, or in a method that senses a contact state depending on a contact that occurs between two contact points owing to deformation of the probe caused by a pushing force of the measurement target portion; a detection error may occur due to the contact with or pushing by a portion other than the human body or by a portion other than the measurement target portion.

Also, there are methods in which a contact state is sensed when two contact points exposed on a surface of a probe simultaneously come into contact with a measurement target portion and are electrically connected together through the measurement target portion, or the contact state is sensed when a measurement target portion comes into contact with a surface portion of a probe functioning as an electrode of a capacitor or a dielectric to change an electrostatic capacity of the capacitor. In these methods, since a metal portion exposed on the surface of the probe comes into contact with a human body, electricity directly flows through the human body so that current leakage of the like may adversely affect the human body. Also, it is difficult to employ antistatic measures because the electrode is arranged on the probe surface, and the static electricity may break internal parts such as a CPU. In a structure that has a protruding switch or an electrode near the probe, a user may feel uncomfortable when the switch or electrode touches the human body.

Patent Document 1: Japanese Patent National Publication No. 61-500038

DISCLOSURE OF THE INVENTION

Problems to be Solved by the Invention

The invention has been made for overcoming the above conventional problems, and an object of the invention is to provide an electronic thermometer that has a simple structure, and can determine a state of contact with a human body without directly exerting an electric influence on a human body while preventing breakage of internal parts due to static electricity.

Means for Solving the Problems

For achieving the above objects, an electronic thermometer according to the invention includes:

a hollow probe provided at its longitudinal end with a temperature measuring unit having a temperature sensor for sensing a temperature;

a pair of electrodes arranged in a hollow of the probe and located near the temperature sensor; and a determining unit for determining whether the temperature measuring unit is in appropriate contact with a measurement target portion of a user or not, based on a change in electrostatic capacity sensed using the electrodes.

When the probe is held, e.g., in an underarm and thereby a portion near the temperature measuring unit comes into contact with the measurement target portion, a change occurs in electrostatic capacity sensed using the electrodes that are arranged in the hollow of the probe and located near the temperature sensor. Based on this change in electrostatic capacity, it is possible to determine whether the temperature measuring unit of the probe is in appropriate contact with the measurement target portion of the user or not.

According to the above structure, the electrode is arranged in the hollow of the probe, and does not come into contact with the human body. Therefore, there is no possibility that the electricity directly flows from the electrode to the human body, and the electrical influence on the human body can be suppressed. Since the electrode is not exposed on the surface of the probe, antistatic measures can be easily taken.

The appropriate contact of the temperature measuring unit with the measurement target portion of the user takes place, e.g., when the temperature measuring unit is in contact with a deeply concave portion of the underarm and the probe held in the underarm is entirely and closely in contact with the underarm, or when the temperature measuring unit is firmly in contact with an underside of a tongue and the probe is firmly held between the tongue and a lower jaw.

A pair of the electrodes may be employed, the electronic thermometer may further include a measuring unit for measuring an electrostatic capacity between the paired electrodes, and the determining unit may determine whether the temperature measuring unit is in appropriate contact with the measurement target portion of the user or not, based on a change in electrostatic capacity measured by the measuring unit.

According to this structure, when a portion around the temperature measuring unit comes into contact with the measurement target portion, the electrostatic capacity between the paired electrodes changes. The contact state can be sensed based on this change in electrostatic capacity.

The paired electrodes may be a pair of cylindrical conductors aligned to each other in a longitudinal direction of the probe with a space therebetween.

Thereby, an annular gap is formed between annular end surfaces of the paired electrodes that are opposed to each other in the longitudinal direction. The change in electrostatic capacity between the electrodes increases as the position of contact with the human body moves toward the gap. Therefore, the largest electrostatic capacity occurs when the human body in contact with the probe surrounds its outer surface portion extending circumferentially around the gap. Therefore, the electrostatic capacity in this state may be handled as the electrostatic capacity that should occur when the temperature measuring unit is in appropriate contact with the measurement target portion. Thereby, it is possible to determine whether the temperature measuring unit at the end of the probe is firmly held in the underarm or the like, or not.

The paired electrodes may be a pair of conductors extending spirally in the longitudinal direction of the probe.

Thereby, the gap between the electrodes has a spiral form extending over a wide area in the longitudinal and circumferential directions of the probe, and this structure increases the range where the state of contact between the human body and the probe can be sensed. Therefore, even when a person such as a baby or a child of smaller sizes than an adult uses the thermometer, the contact state can be appropriately sensed.

The paired electrodes may be a pair of semicylindrical conductors arranged symmetrically with respect to an axis extending in the longitudinal direction of the probe.

Thereby, the gap between the electrodes is formed over a wide area in the longitudinal direction of the probe, and this structure increases longitudinally the range where the state of contact between the human body and the probe can be sensed. Therefore, even when a person such as a baby or a child of smaller sizes than an adult uses the thermometer, the contact state can be appropriately sensed.

The determining unit may determine whether the temperature measuring unit is in appropriate contact with the measurement target portion of the user or not, based on the change in electrostatic capacity formed between a body of the user and the electrode.

This structure allows the detection of the contact state by the one electrode, and can be simple.

The electronic thermometer may further include a measuring unit for measuring an electrostatic capacity produced by composition of an electrostatic capacity formed between the user's body and the electrode, an electrostatic capacity formed between the electronic thermometer and a ground, and an electrostatic capacity formed between the user's body and the ground.

The determining unit may assume the change in electrostatic capacity measured by the measuring unit as the change in electrostatic capacity formed between the user's body and the electrode, and may determine whether the temperature measuring unit is in appropriate contact with the measurement target portion of the user or not.

Since the electrostatic capacity between the user and the electrode is much smaller in value than the other electrostatic capacities, the change in electrostatic capacity between the user and the electrode affects the change in composite capacity to an extremely higher extent than the other changes in electrostatic capacity. Therefore, by measuring the composite capacity and sensing the changes in it, it is possible to sense the change in electrostatic capacity between the user and the electrode, and thus to sense the state of contact between the temperature measuring unit and the measurement target portion.

Preferably, the thermometer is an electronic thermometer predicting the user's temperature.

According to this structure, the prediction of the temperature can start after the temperature measuring unit of the probe comes into appropriate contact with the measurement target portion. Therefore, the temperature can be predicted more accurately.

Preferably, the electronic thermometer further includes notifying means for providing a notification to the user when the determining unit determines that the temperature measuring unit is not in appropriate contact with the measurement target portion of the user.

This structure can notify the user of the fact that the temperature measuring unit is not in appropriate contact with the measurement target portion, and can urge the user to restore the appropriate contact state. Therefore, the temperature can be measured more accurately.

Preferably, the determining unit determines whether the temperature measuring unit is in appropriate contact with the measurement target portion of the user or not, based on the change in the electrostatic capacity and the change in temperature sensed by the temperature sensor.

Thereby, even in the case where the temperature measuring unit is not practically in appropriate contact with the measurement target portion, but the change in electrostatic capacity satisfies the reference for determining the contact of the temperature measuring unit as the appropriate contact, it can be determined that temperature measuring unit is not in appropriate contact, unless the change in temperature satisfies the reference for determining the contact of the temperature measuring unit as the appropriate contact. Therefore, erroneous sensing of the contact state by the temperature measuring unit can be suppressed, and the accuracy of the temperature measurement can be improved.

Effects of the Invention

As described above, the invention can provide a simple structure that determines a state of contact with a human body without directly exerting an electric influence on a human body while preventing breakage of internal parts due to static electricity.

BRIEF DESCRIPTION OF THE DRAWINGS

FIGS. 5A and 5B illustrate a principle of change in electrostatic capacity between conductors.

BEST MODES FOR CARRYING OUT THE INVENTION

Figure 1:
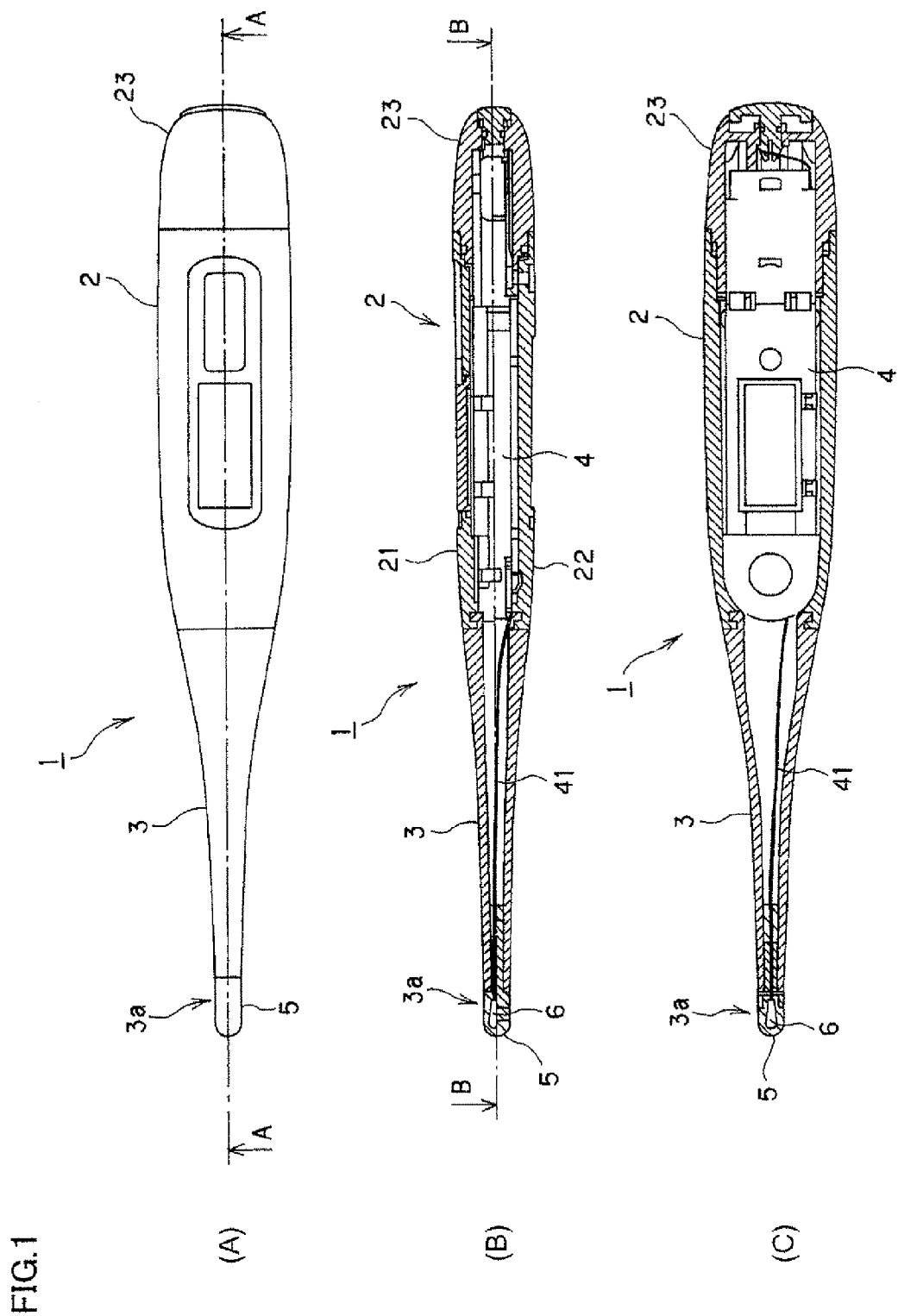
FIGS. 1A, 1B and 1C show a schematic structure of a whole electronic thermometer.

Referring to the drawings, best modes for carrying out the invention will be described below, by way of example, based on embodiments. However, sizes, materials, forms, relative positions and others of components described in the embodiments are not intended to restrict the scope of the invention, unless otherwise specified.

Basic Structure of an Electronic Thermometer

Referring first to FIGS. 1A, 1B and 1C, description will now be given on a basic structure commonly used in electronic thermometers of respective embodiments of the invention to be described below. FIGS. 1A, 1B and 1C schematically show a whole structure of an electronic thermometer according to an embodiment of the invention. FIG. 1A is a plan of the electronic thermometer, FIG. 1B is a cross section taken along line A-A in FIG. 1A, and FIG. 1C is a cross section taken along line B-B in FIG. 1B. FIGS. 1A, 1B and 1C do not show a human body contact sensor that will be described later in connection with the embodiments.

As shown in FIGS. 1A, 1B and 1C, an electronic thermometer 1 includes a thermometer body 2 having a display, a switch and the like, and also includes a probe 3 that is made of elastomer and is to be held, e.g., in an underarm or a hypoglottis for contact with a measurement target portion such as an underarm or hypoglottis. Thermometer body 2 is formed of a housing 20 that is made of an ABS resin or the like and is provided with a display window, a switch and the like, as well as internal parts 4 such as a circuit board, a power supply, a display panel, e.g., of an LCD and a buzzer arranged in housing 20. Probe 3 is a hollow rod-like member that extends lengthwise from an end, in the longitudinal direction, of thermometer body 2 having substantially a rectangular parallelepiped form, and has a tapered form converging toward a end on which a temperature measuring unit 3a is arranged.

Housing 2 is formed of upper and lower housings 21 and 22. A base end of probe 3 is fixedly held between upper and lower housings 21 and 22. A battery cover 23 allowing an exchange of the power supply such as a battery is removably attached to a housing portion remote from the position where probe 3 is fixed.

Temperature measuring unit 3a at the end of probe 3 is formed of a cap 5 and a temperature sensor 6 such as a thermistor that is embedded in cap 5 and is fixed thereto by an adhesive. Temperature sensor 6 is electrically connected to a CR oscillation circuit among internal parts 4 by a lead 41 extending from internal parts 4 through the hollow of probe 3. Temperature sensor 6 changes its resistance value according to heat transmitted from an outer surface of temperature measuring unit 3a (cap 5). Temperature measurement is performed by providing this change in resistance value to the CR oscillation circuit.

The structure already described is commonly employed in all the embodiments to be described below, and these embodiments will be described without repeating the description of the above common structure. The structure described above is merely an example, and the invention is not restricted to it. For example, a structure having a probe integral with a housing of a thermometer body may be employed.

First Embodiment

Figure 2:
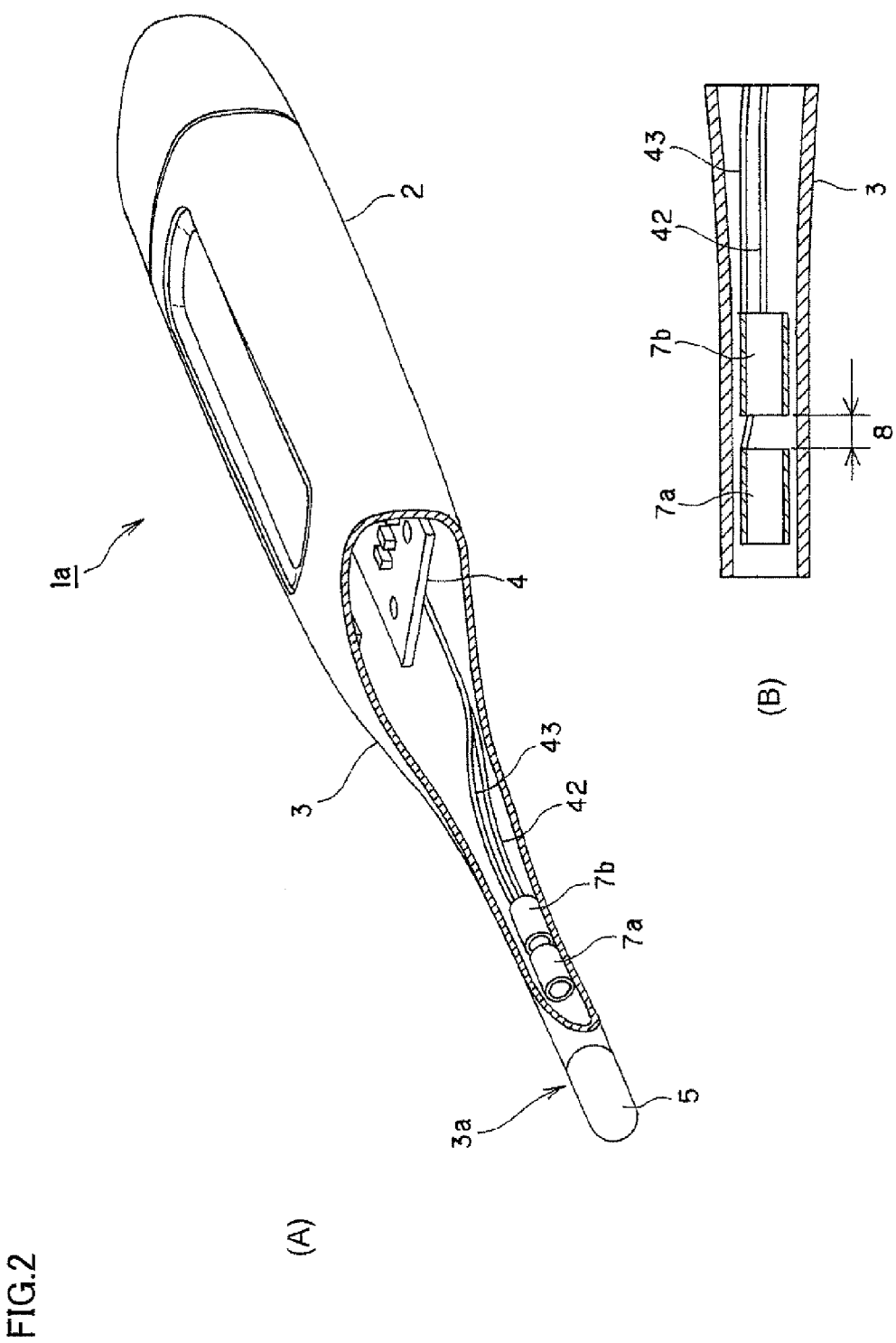
FIGS. 2A and 2B are schematic views showing a distinctive portion of the electronic thermometer according to a first embodiment.
Figure 3:
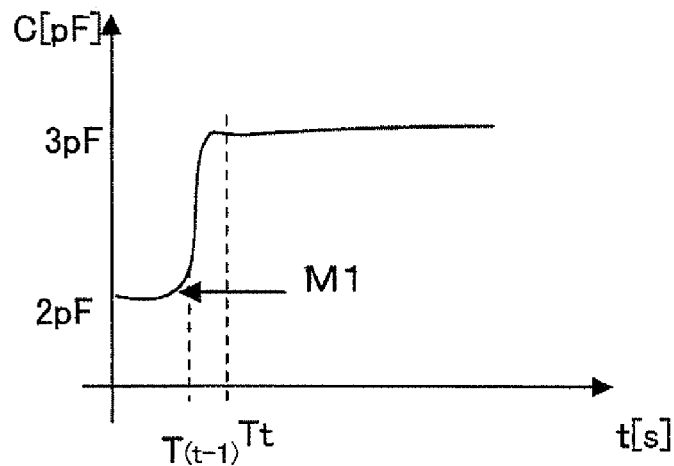
FIG. 3 is a graph illustrating a change that occurs in electrostatic capacity when a measurement target portion is in appropriate contact with a temperature measuring unit.
Figure 4:
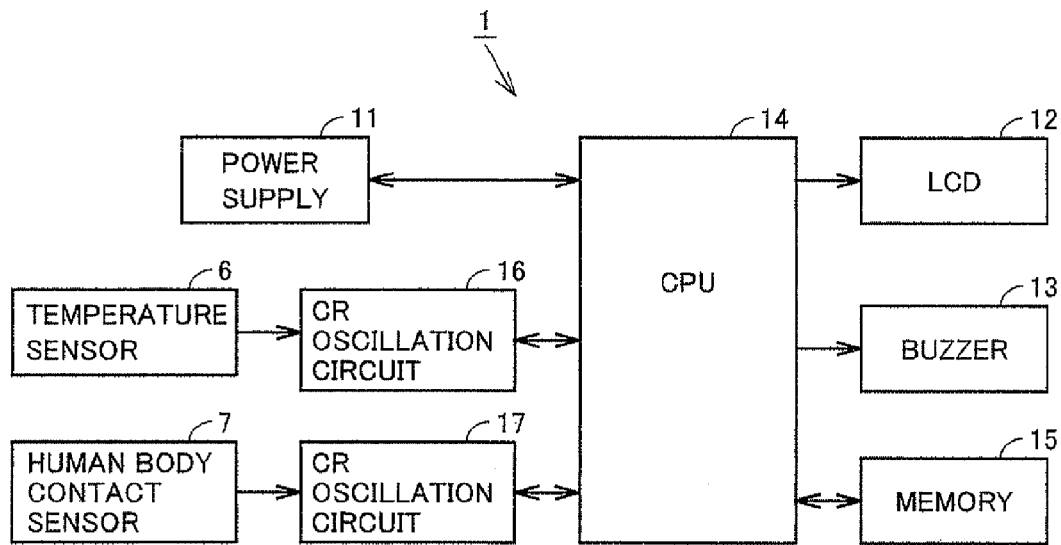
FIG. 4 is a schematic block diagram showing an electrical structure of the electronic thermometer.
Figure 6:
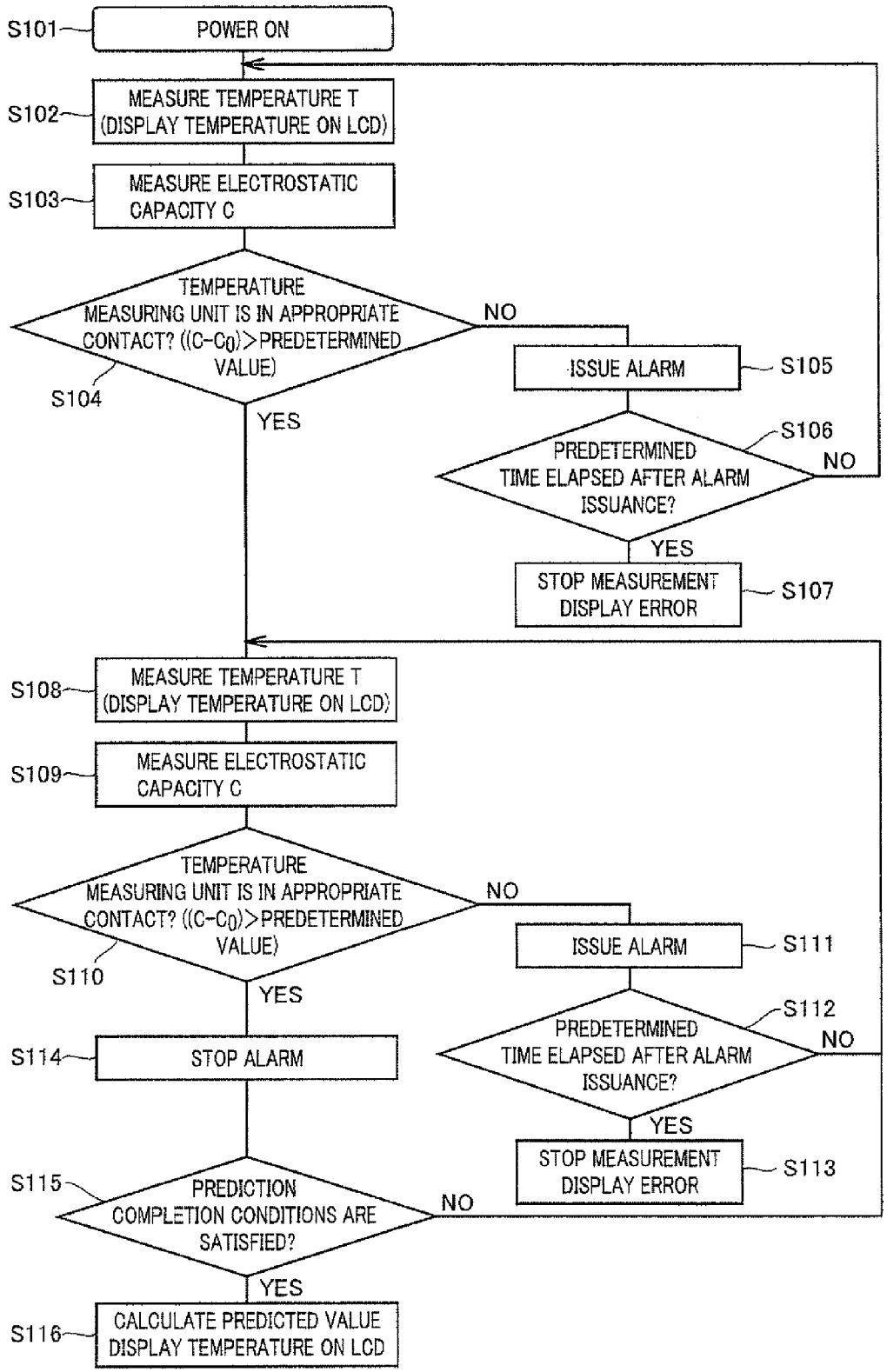
FIG. 6 is a flowchart of body temperature measurement of the electronic thermometer.
Figure 7:
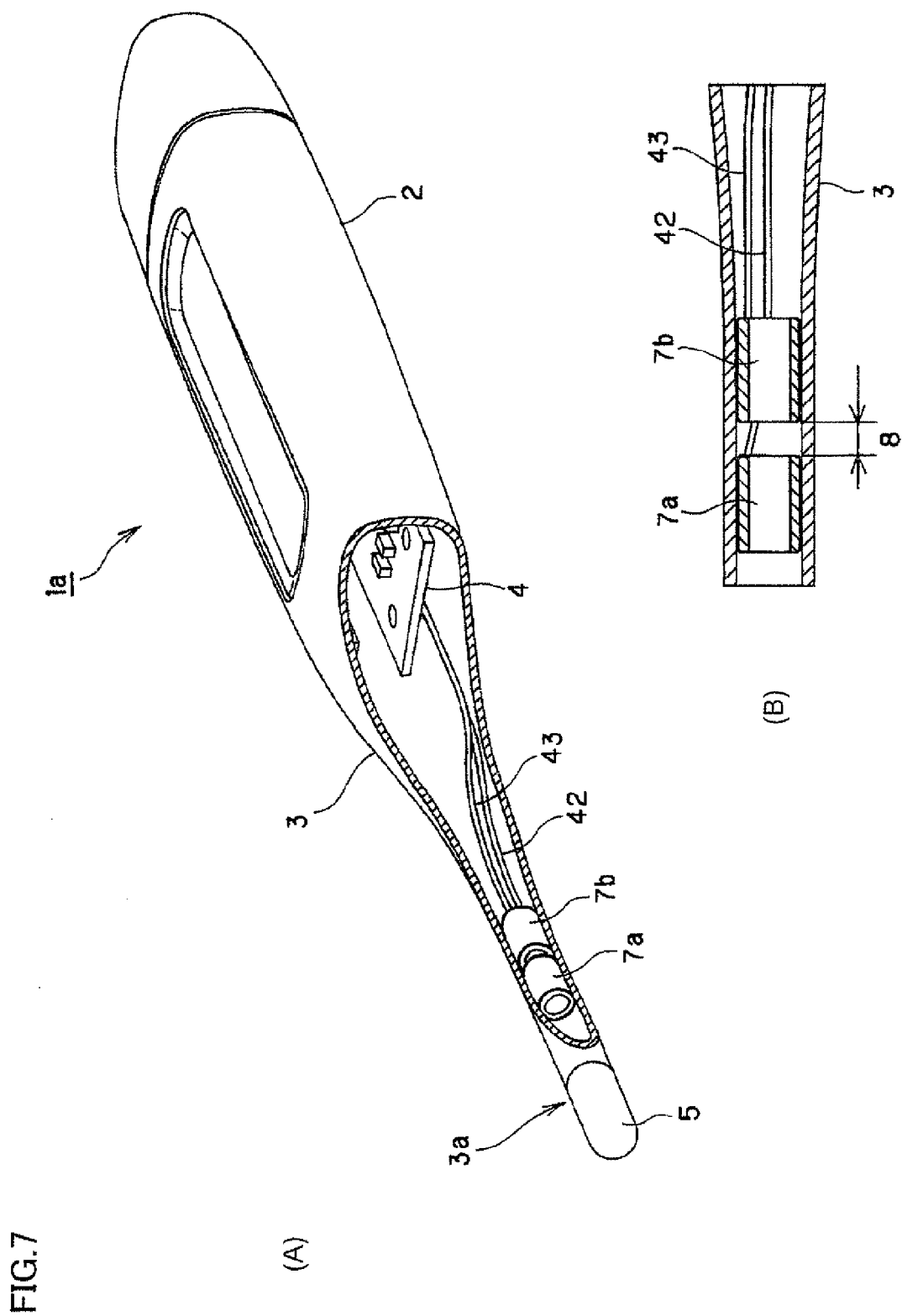
FIGS. 7A and 7B are schematic views showing a specific example of the conductors.
Figure 8:
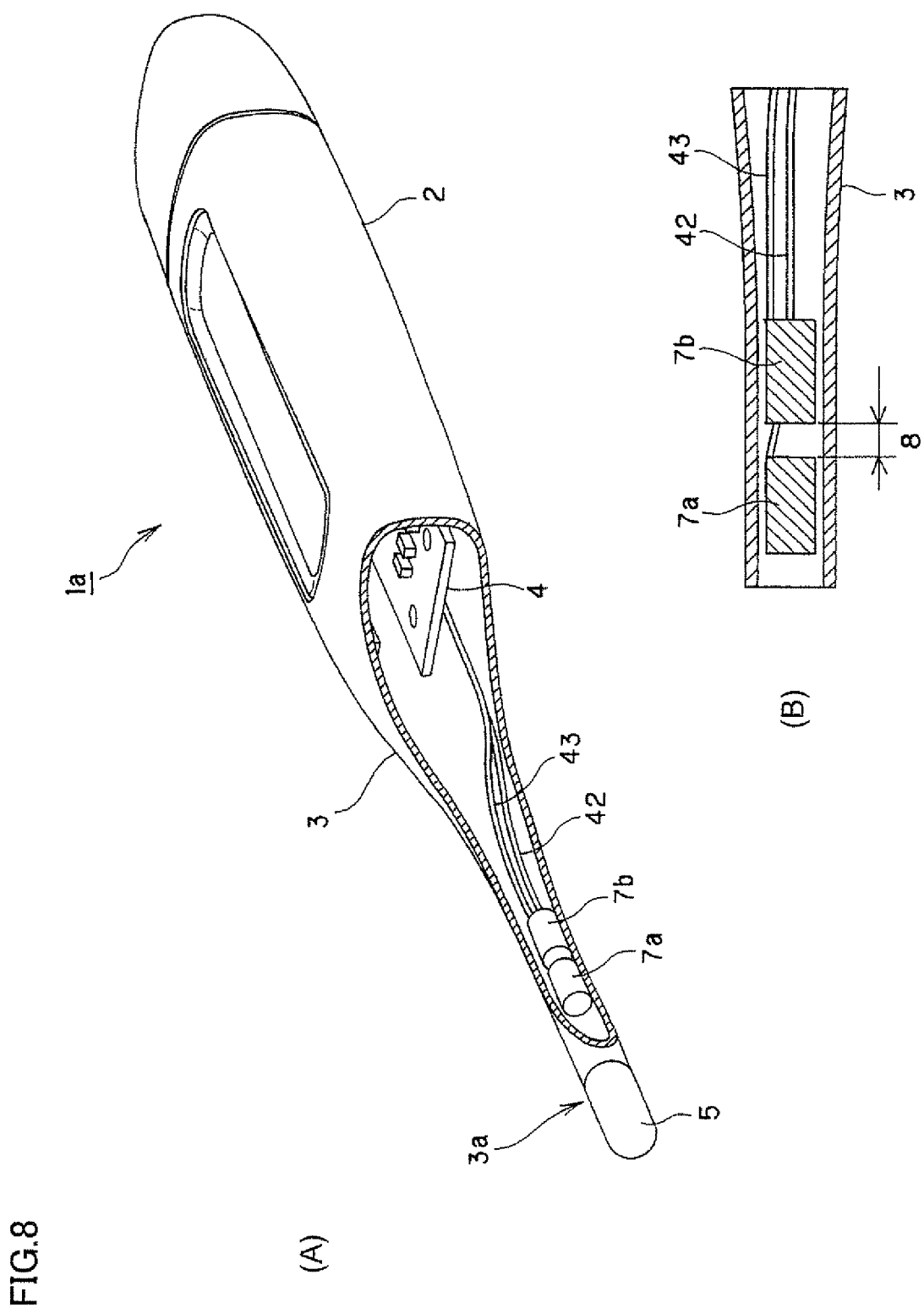
FIGS. 8A and 8B are schematic views showing a specific example of the conductors.
Figure 9:
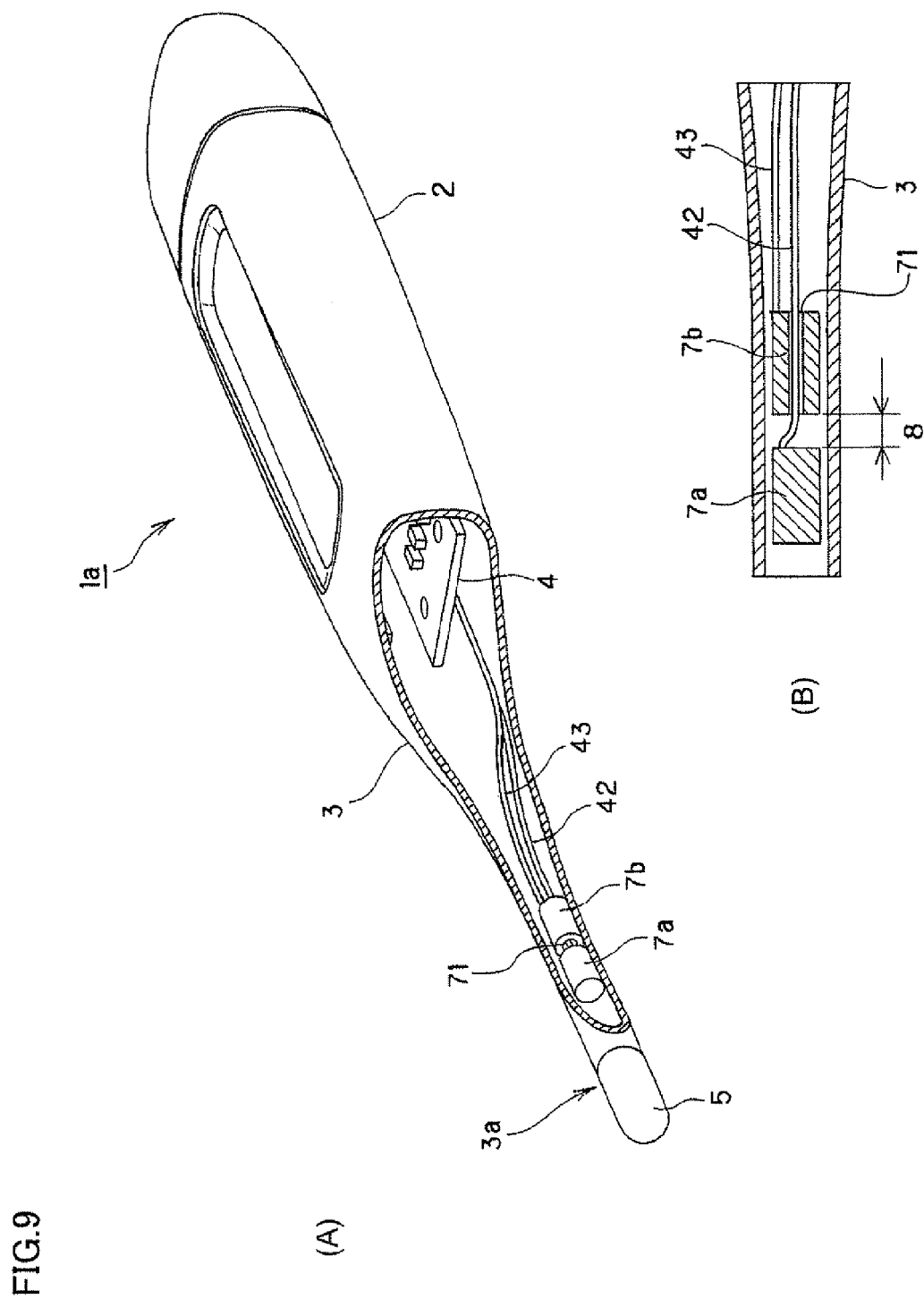
FIGS. 9A and 9B are schematic views showing a specific example of the conductors.
Figure 10:
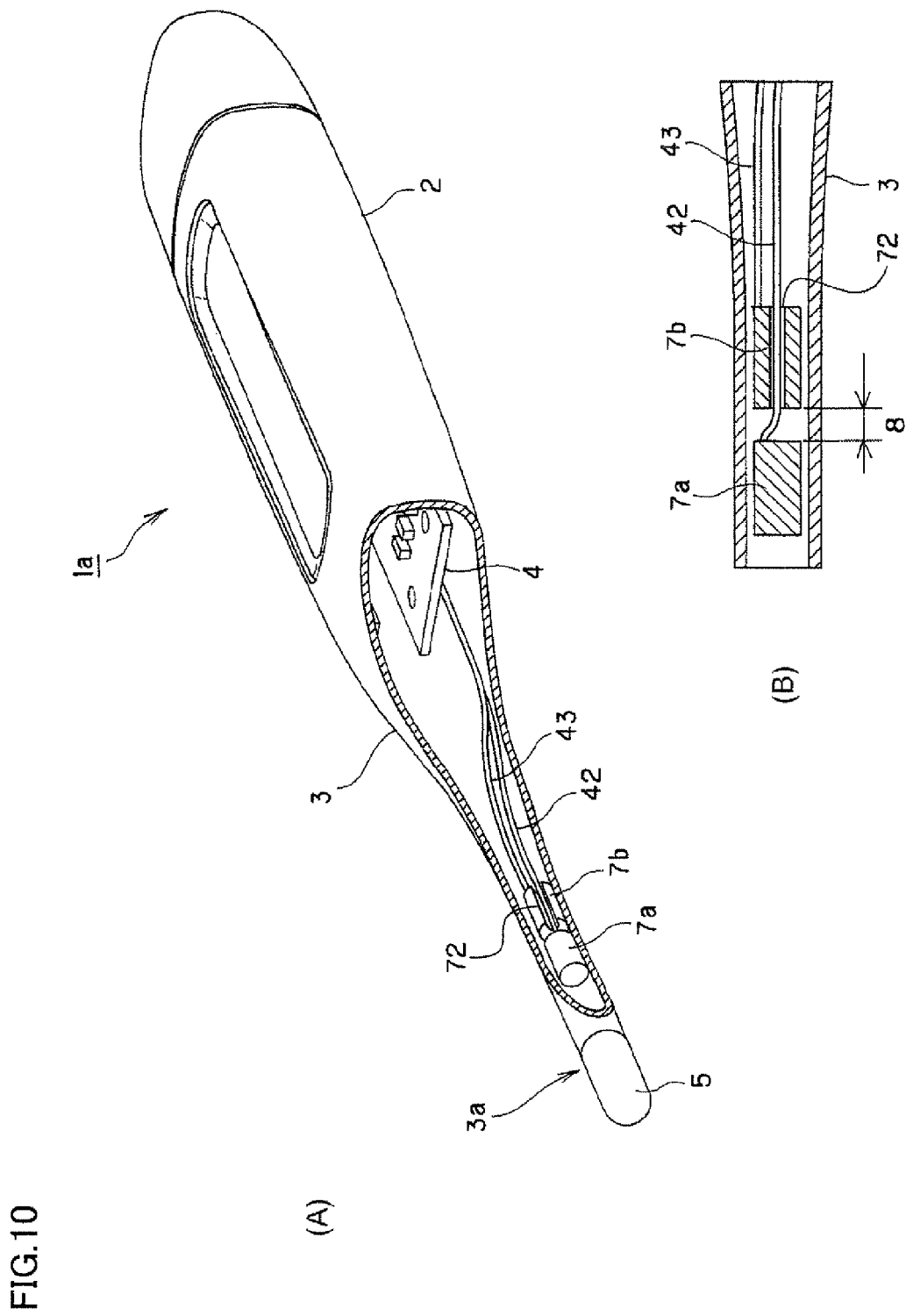
FIGS. 10A and 10B are schematic views showing a specific example of the conductors.

Referring to FIGS. 2A to 6, an electronic thermometer according to a 1st-a embodiment of the invention will be described below. FIGS. 2A and 2B are schematic views showing a distinctive portion of the electronic thermometer according to this embodiment. FIG. 2A is a perspective view with a probe partially cut way, and FIG. 2B is a longitudinal section of a tip-side portion of the probe. FIG. 3 is a graph showing a change that occurs in electrostatic capacity when temperature measuring unit 3a is in appropriate contact with the measurement target portion. In this graph, the abscissa gives a time (s) and the ordinate gives an electrostatic capacity (pF). FIG. 4 is a schematic block diagram showing an electrical structure of the electronic thermometer. FIGS. 5A and 5B illustrate a principle of change that occurs in electrostatic capacity between electrodes in response to contact with a human body. FIG. 5A illustrates the state of electric charges that are present between the electrodes when the human body is spaced from the probe. FIG. 5B shows the state of electric charges that are present between the electrodes when the human body is in contact with the probe. FIG. 6 is a flowchart of body temperature measurement of the electronic thermometer according to the embodiment.

<Human Body Contact Sensor>

As shown in FIGS. 2A and 2B, an electronic thermometer 1a according to the embodiment has a pair of conductors 7a and 7b located in the hollow of probe 3 and particularly in a tip-side region near temperature sensor 6. FIGS. 2A and 2B do not show some of internal parts 4 and lead 41 connected to temperature sensor 6.

Each of paired conductors 7a and 7b is made of copper, SUS or the like, and has a cylindrical form extending in the longitudinal direction of probe 3. Paired conductors 7a and 7b are arranged in the hollow of probe 3, and are adjacent to each other in the longitudinal direction with a predetermined space (a gap 8) therebetween.

Paired conductors 7a and 7b are electrically isolated from each other, are connected to a circuit board of internal parts 4 through leads 42 and 43, respectively, and form a pair of electrodes (capacitors) accumulating the electric charges when a voltage is applied between them. An electrostatic capacity occurring between conductors (electrodes) 7a and 7b changes when the human body comes into contact with the outer sides of conductors 7a and 7b through probe 3 because there is a difference in dielectric constant between the air and the human body. Thereby, paired conductors (electrodes) 7a and 7b function as a human body contact sensor 7 that can sense the contact of the human body with probe 3.

The temperature is measured in such a state that temperature measuring unit 3a and the region of probe 3 near temperature measuring unit 3a are in contact with the temperature measurement target portion of the human body, e.g., in a pinched fashion. Thereby, when human body contact sensor 7 arranged near temperature measuring unit 3a senses the state of contact of the human body, it can determine whether temperature measuring unit 3a is in appropriate contact with the measurement target portion or not.

As shown in FIG. 3, the electrostatic capacity between conductors 7a and 7b was about 2 pF before the measurement target portion comes into contact with temperature measuring unit 3a, and is about 3 pF after the contact. Thus, it can be understood that the contact of the measurement target portion with temperature measuring unit 3a increases the electrostatic capacity of human body contact sensor 7 by about 1 pF. In the figure, M1 indicates an instant at which the probe is firmly held in an underarm. Therefore, by using, as the reference, the case where the amount of increase of the electrostatic capacity exceeds 0.5 pF, it is possible to determine whether temperature measuring unit 3a is in appropriate contact with the measurement target portion or not.

The amount of increase of the electrostatic capacity increases as the position of contact with the human body becomes closer to the gap formed between the opposite surfaces of respective conductors 7a and 7b spaced by the minimum distance. In this embodiment, the annular end surfaces of conductors 7a and 7b that are axially opposed to each other are the opposed surfaces spaced by the minimum distance. The maximum increase occurs in electrostatic capacity when the human body portion in contact with probe 3 is located along annular gap 8 formed between these opposed surface and surrounds circumferentially the outer surface of probe 3. Therefore, this electrostatic capacity can be assumed or handled as the electrostatic capacity that will appear when temperature measuring unit 3a is in appropriate contact with the measurement target portion. Thereby, it is possible to determine whether temperature measuring unit 3a at the end of probe 3 is firmly held in the underarm or the like, or not.

The amount of increase of the electrostatic capacity increases as the contact area between probe 3 and the human body becomes wider. For example, therefore, a reference amount of increase can be set larger than an amount of increase that will occur when probe 3 is merely held, e.g., between fingertips, and the determination that temperature measuring unit 3a is in appropriate contact with the measurement target portion can be performed based on this reference amount of increase, whereby the erroneous determination can be performed.

<Electrical Structure of the Electronic Thermometer>

As shown in FIG. 4, electronic thermometer 1a primarily includes temperature sensor 6, human body contact sensor 7, a power supply unit 11, an LCD 12, a buzzer 13, a CPU (Central Processing Unit) 14, a memory 15 and CR oscillation circuits 16 and 17.

Power supply unit 11 has a power supply such as a battery and supplies an electric power to CPU 14. LCD 12 serves as a display unit and displays a result of measurement and the like under the control of CPU 14. Buzzer 13 serves as notifying means for a user and issues an alarm under the control of CPU 14. The notifying means for the user is not restricted to the buzzer, and may be turn-on/off of an LED, rumbling of a buzzer, a voice IC, vibrations, smell or the like. CPU 14 is connected to a storage device such as an ROM or an RAM.

CR oscillation circuit 16 converts the change in resistance value provided from temperature sensor 6 into a frequency, and provides it to CPU 14. CR oscillation circuit 17 converts a change in electrostatic capacity provided from human body contact sensor 7 into a frequency, and provides it to CPU 14.

Referring to FIGS. 5A and 5B, description will be given on a principle of change that occurs in electrostatic capacity between conductors (electrodes) 7a and 7b. Although FIGS. 5A and 5B conceptually show that a human body 9 is in direct contact with conductors 7, probe 3 is interposed between them in practice.

Since a relative permittivity of the human body is larger than that of the air, a region of human body 9 near the electrodes induces more electric charges than the air when human body 9 is in contact with probe 3. Thereby, the electrostatic capacity between conductors 7a and 7b increases.

CPU 14 measures the change in electrostatic capacity that is converted into the frequency by CR oscillation circuit 17, and determines whether temperature measuring unit 3a is in appropriate contact with the measurement target portion or not. Thus, in electronic thermometer 1 according to the embodiment, CPU 14 serves as both the temperature measuring unit and the determining unit in the invention.

<Temperature Measurement Flow>

Referring to FIG. 6, description will be given on a flow of the temperature measurement in electronic thermometer 1a according to this embodiment. The following description will be given on the case wherein electronic thermometer 1a of this embodiment is of an estimation or prediction type.

In electronic thermometer 1a according to the embodiment, when the power supply is turned on (S101), CPU 14 starts the temperature sensing by temperature sensor 6 (S102), and starts sensing the electrostatic capacity by human body contact sensor 7 (S103). Memory 15 stored a value C0 (pF) of the electrostatic capacity that was sensed immediately after the power-on, and CPU 14 determines whether temperature measuring unit 3a is in appropriate contact with the measurement target portion or not, based on whether a value C (pF) of the electrostatic capacity sensed the above storage exceeds C0 by a predetermined value or more, or not (S104). Immediately after the power-on, electronic thermometer 1 is not yet held in the underarm, and therefore sensed electrostatic capacity C does not change so that CPU 14 determines that temperature measuring unit 3a is not in contact with the measurement target portion (NO in S104), and buzzer 13 issues an alarm (S105). CPU 14 repeats sensing the temperature and electrostatic capacity within a predetermined time from the issuance of the alarm, until sensed value C of the electrostatic capacity becomes higher, by the predetermined value, than value C of the electrostatic capacity that was measured immediately after the power-on, i.e., until it is determined that temperature measuring unit 3a is in appropriate contact with the measurement target portion (NO in S104 and NO in S106). Memory 15 stores the sensed value at appropriate times.

The above predetermined value may be 0.5 pF. For example, the sensing conditions may be such that the sensing of the temperature and electrostatic capacity is performed at intervals of one second, and the determination about the appropriate contact of temperature measuring unit 3a with the measurement target portion continues for a period of 15 seconds. These conditions are described by way of example, and are not restrictive.

When the predetermined time has elapsed but the amount (C−C0) of increase of the electrostatic capacity has not reached the predetermined value (YES in S106), CPU 14 determines that temperature measuring unit 3a is not in appropriate contact with the measurement target portion, stops the measurement and performs the error display on LCD 12 (S107). When the amount (C−C0) of increase of the electrostatic capacity exceeded the predetermined value within the predetermined time (YES in S104), CPU 14 determines that temperature measuring unit 3a is in appropriate contact with the measurement target portion, proceeds to the temperature measurement and starts the prediction measurement (S108).

When the difference (C−C0) between the value of the electrostatic capacity that was first sensed immediately after the start of the prediction measurement and the value of the electrostatic capacity sensed immediately after the power-on is not smaller than a predetermined value (YES in S110), buzzer 13 stops the alarm (S114), and CPU 14 will continue the temperature measurement until the prediction completion conditions are satisfied. Also, CPU 14 will continue the sensing of the electrostatic capacity by human body contact sensor 7 (NO in S115, S108 and S109). When the difference (C−C0) between the sensed value of the electrostatic capacity and the value of the electrostatic capacity sensed immediately after the power-on becomes lower than the above predetermined value, e.g., due to the shifting of the position of temperature measuring unit 3a during the temperature measuring, (NO in S110), CPU 14 determines that temperature measuring unit 3a is not in appropriate contact with the measurement target portion, and buzzer 13 issues the alarm (S111). The alarm continues or repeats the alarm issuance until the difference (C−C0) between the sensed value of the electrostatic capacity and the value of the electrostatic capacity sensed immediately after the power-on exceeds the above predetermined value within a predetermined time, e.g., of 15 seconds, i.e., until it is determined that temperature measuring unit 3a is in appropriate contact with the measurement target portion, e.g., owing to correction of the shifted position of temperature measuring unit 3a (NO in S110, S111 and NO in S112).

When the position of temperature measuring unit 3a is not corrected and the difference (C−C0) of the electrostatic capacity does not exceed the predetermined value within the predetermined time after the alarm was issued (YES in S112), CPU 14 stops the measurement, and performs the error display on LCD 12 (S113). When the position of temperature measuring unit 3a is corrected and the difference (C−C0) of the electrostatic capacity exceeds the predetermined value within the predetermined time after the alarm was issued (NO in S112 and YES in S110), buzzer 13 stops the alarm (S114), and CPU 14 continues the sensing of the temperature and the electrostatic capacity until the prediction measurement completion conditions are satisfied (NO in S115).

While the alarm is not issued and the difference (C−C0) of the electrostatic capacity keeps the value larger than the predetermined value (YES in S110), CPU 14 determines that the appropriate contact state is being kept, and skips S114 to continue sensing the temperature and the electrostatic capacity until the prediction measurement completion conditions are satisfied (NO in S115).

When the prediction measurement completion conditions are satisfied (YES in S115), CPU 14 ends the measurement and calculate the predicted value to display a result of the measurement on LCD 12 (S116).

Advantages of this Embodiment

According to the embodiment, the conductor is not configured to contact directly with the human body so that a current does not directly flow to the human body through the conductor, and a direct and electric influence on the human body can be suppressed. Since the conductor is not externally exposed on the probe, the probe made of resin serves as a protection against the static electricity when it is applied to the thermometer, and can prevent breakage of the internal parts such as the CPU due to the static electricity.

This embodiment measures not only the state of contact between the temperature measuring unit and the measurement target portion at the start of the measurement but also the contact state during the measurement. Therefore, the embodiment can always monitor the state of contact between the measurement target portion and the temperature measuring unit, and can improve the accuracy of the temperature measurement. Therefore, this embodiment can be preferably employed particularly in the prediction type of thermometer. Specifically, the prediction type of thermometer can measure the temperature within a short time, but the accuracy of the prediction result may be low when the measurement target portion is not firmly in contact with the temperature measuring unit. However, the embodiment can start the prediction after the temperature measuring unit appropriately comes in contact with the measurement target portion so that it can predict the temperature more accurately.

More specific structures of conductors 7a and 7b will be described below with reference to FIGS. 7A to 10B. FIGS. 7A to 10B are schematic views showing various specific examples of conductors 7a and 7b. FIGS. 7A, 8A, 9A and 10A are perspective views of the probe with a certain part cut away. FIGS. 7B, 8B, 9B and 10B are longitudinal sections of the end side of the probe.

For the sake of illustration, FIGS. 2A and 2B schematically show as if a space is present between the inner surface of probe 3 and the outer peripheral surfaces of conductors 7a and 7b. In practice, however, it is preferable to keep the inner surface of probe 3 in contact with the outer peripheral surfaces of conductors 7a and 7b without a space therebetween as shown in FIGS. 7A and 7B so that a dielectric layer of the air may not be formed between the human body and conductors 7a and 7b. In this arrangement, conductors may have, e.g., such tubular forms that the radial sizes thereof change according to the form of the inner peripheral surface of probe 3 as the position moves in the longitudinal direction.

As shown in FIGS. 8A and 8B, each of conductors 7a and 7b may be a block member having a form of a substantially circular column, instead of the tubular member. In this case, for arranging lead 42 connected to conductor 7a on the end side of the probe, conductor 7b may be provided with a through hole 71 shown in FIGS. 9A and 9B or a recess 72 shown in FIGS. 10A and 10B.

Second Embodiment

Figure 11:
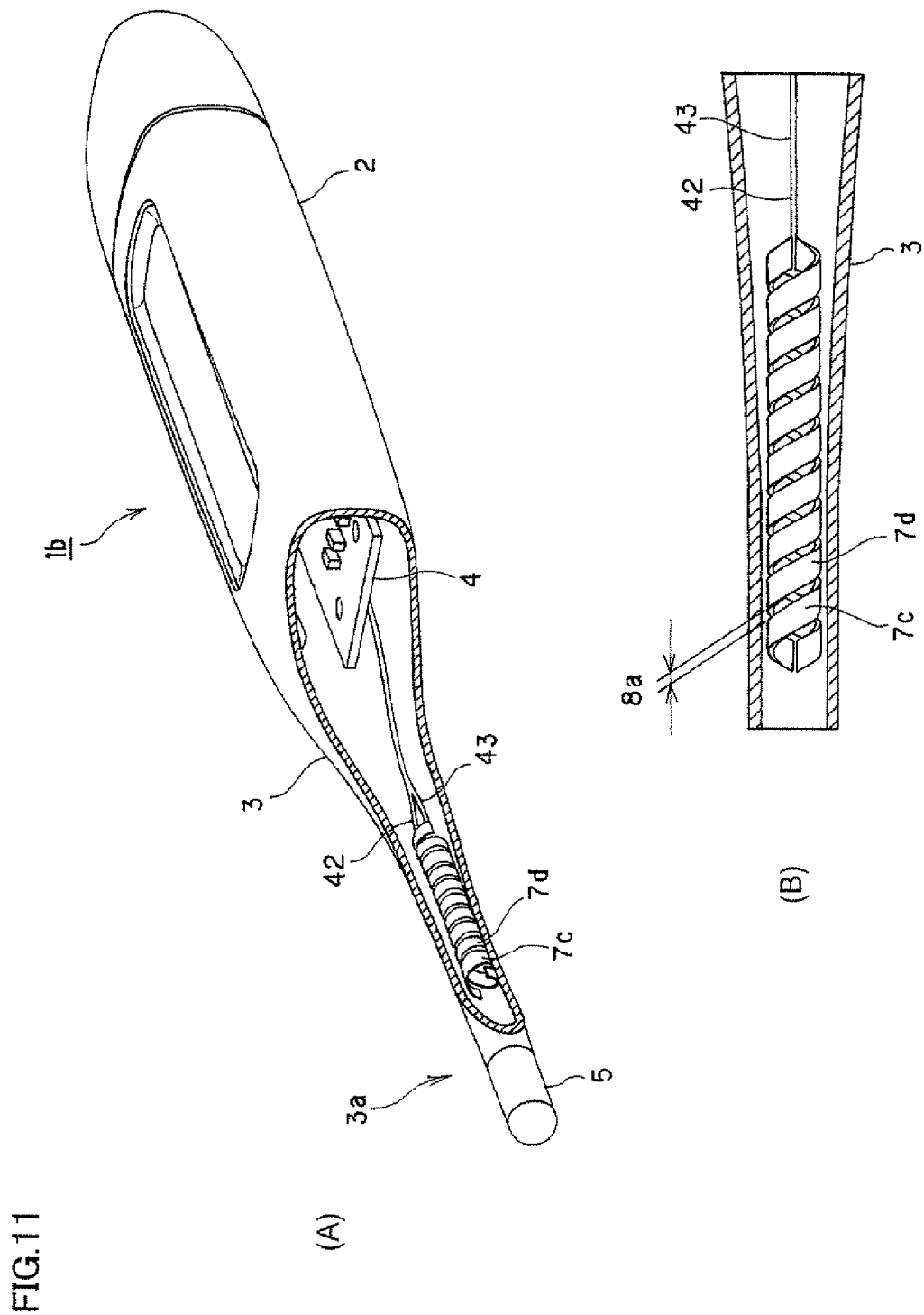
FIGS. 11A and 11B are schematic views showing a distinctive portion of an electronic thermometer according to a second embodiment.

Referring to FIGS. 11A and 11B, an electronic thermometer 1b according to a second embodiment of the invention will be described below. FIGS. 11A and 11B are schematic views showing a distinctive portion of electronic thermometer 1b according to this embodiment. FIG. 11A is a perspective view showing a probe with a certain part cut away, and FIG. 11B is a longitudinal section of the probe. The following description will be given on only differences from the foregoing embodiment. The same members and structures bear the same reference numbers, and description thereof is not repeated. The same members and structures perform or offer substantially the same operations, effects and the like.

This embodiment uses a pair of spiral conductors 7c and 7d as human body contact sensor 7.

As shown in FIGS. 11A and 11B, the spirals of conductors 7c and 7d are coaxial with each other, and are turned in the same direction. Also, conductors 7a and 7b arranged in the hollow of probe 3 are shifted in the longitudinal direction from each other so that the respective turns of conductor 7a and those of conductor 7b are located alternately in the longitudinal direction. The beginning and terminating ends of conductor 7a are located in the same longitudinal positions as those of conductor 7b, respectively, but are substantially opposed in the direction perpendicular to the longitudinal direction to those of conductor 7b with the axis of the serials located therebetween, respectively. A gap 8a formed by surfaces defining the shortest distance between conductors 7c and 7d extends spirally in the longitudinal direction.

In contrast to annular gap 8 in the first embodiment, the above structure forms spiral gap 8a extending over a wide range in the longitudinal and circumferential directions of probe 3 so that this structure can increase a range where the contact state between the human body and probe 3 can be sensed. Therefore, even when a person such as a baby or a child of smaller sizes than an adult uses the thermometer, the contact state between the human body and probe 3 can be appropriately sensed.

Similarly to the first embodiment, it is preferable in this embodiment to keep the contact between the inner surface of probe 3 and outer peripheral surfaces of conductors 7c and 7d without a space so that the dielectric layer of the air may not be formed between the human body and conductors 7c and 7d.

Third Embodiment

Figure 12:
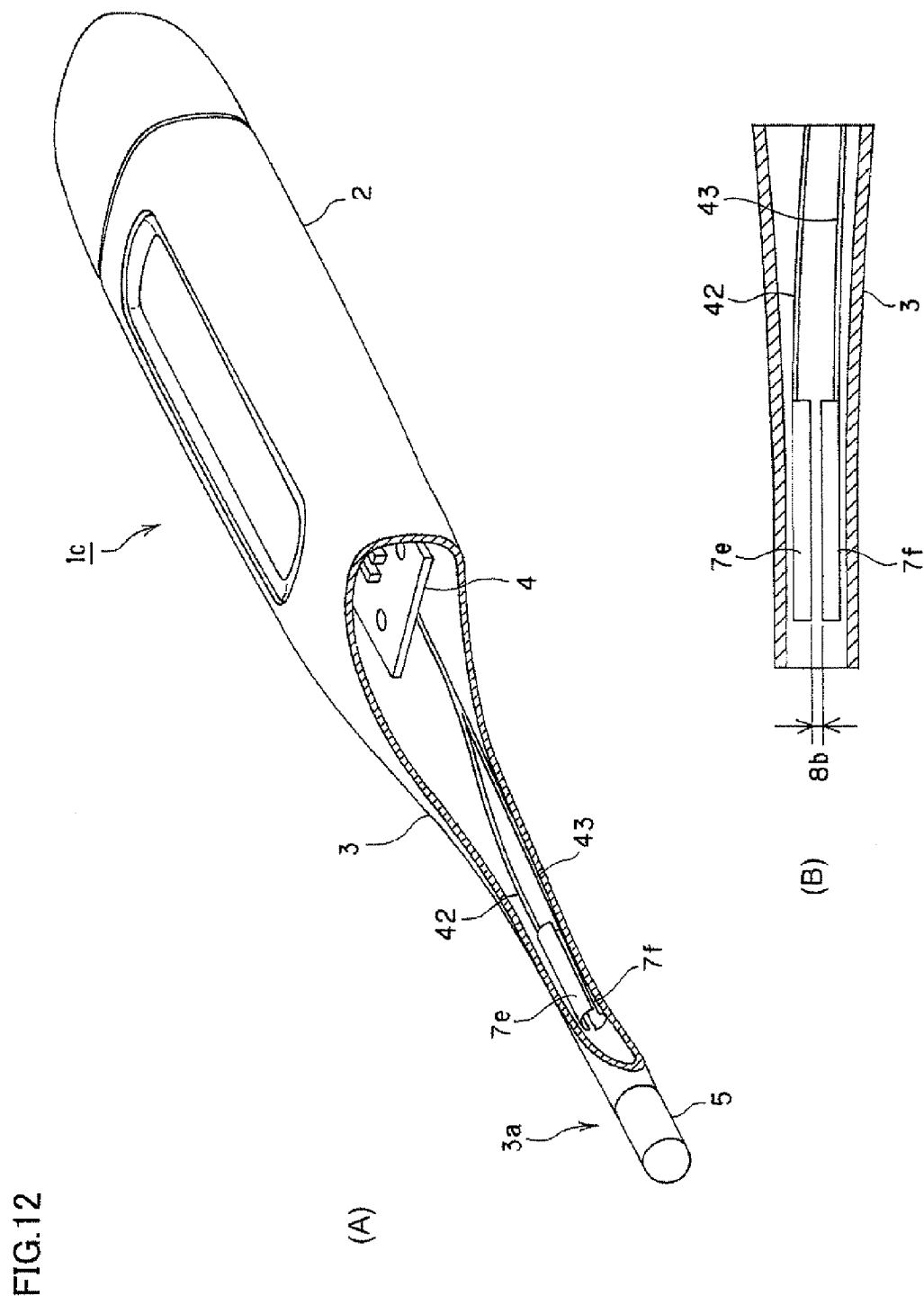
FIGS. 12A and 12B are schematic views showing a distinctive portion of an electronic thermometer according to a third embodiment.

Referring to FIGS. 12A and 12B, description will be given on an electronic thermometer 1c according to a third embodiment of the invention. FIGS. 12A and 12B are schematic views showing a distinctive portion of electronic thermometer 1c according to a third embodiment. FIG. 12A is a perspective view showing a probe with a certain part cut away, and FIG. 12B is a longitudinal section of the probe. The following description will be given on only differences from the foregoing embodiments. The same members and structures bear the same reference numbers, and description thereof is not repeated. The same members and structures perform or offer substantially the same operations, effects and the like.

As human body contact sensor 7, this embodiment uses a pair of conductors 7e and 7f each having a semicylindrical form.

As shown in FIGS. 12A and 12B, conductors 7e and 7f have forms that can be prepared by longitudinally dividing a cylinder extending in the longitudinal direction of probe 3 into two parts, respectively. Conductors 7e and 7f have concavely curved inner surfaces that are opposed to each other in a direction perpendicular to the longitudinal direction of probe 3, and are arranged symmetrical with respect to the longitudinal axis or center. Each of conductors 7e and 7f has end surfaces neighboring to the longitudinal edges of the above concavely curved surface. These end surfaces of each conductors 7e or 7f are opposed to the end surfaces of the other conductor with the minimum distance kept between conductors 7e and 7f so that a gap 8b extending in the longitudinal direction is formed between these end surfaces.

According to this structure, gap 8b extending in the longitudinal direction of probe 3 longitudinally increases the sensible range, in which the contact state of the human body and probe 3 can be sensed, as compared with annular gap 8 in the first embodiment. Therefore, the contact state between the human body and probe 3 can be appropriately sensed even when a person such as a baby or a child of smaller sizes than an adult uses the thermometer.

Similarly to the first and second embodiments, it is preferable in this embodiment that the outer peripheral surfaces of conductors 7e and 7f are in contact with the inner surface of probe 3 without a gap so that a dielectric layer of the air may not be formed between the human body and conductors 7e and 7f.

Fourth Embodiment

Figure 13:
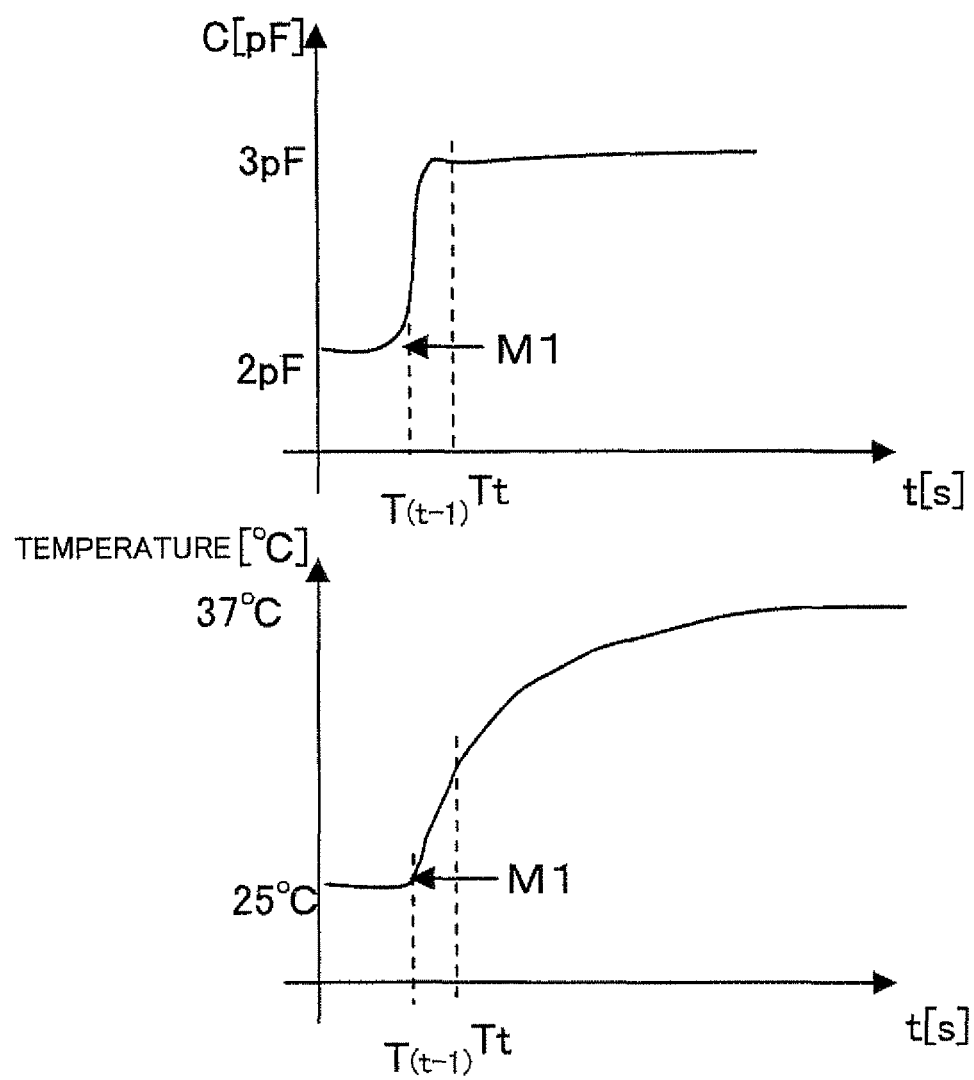
FIG. 13 is a graph showing a relationship between a change in electrostatic capacity and a change in temperature that occur with time in the state where the temperature measuring unit is in appropriate contact with the measurement target portion.
Figure 14:
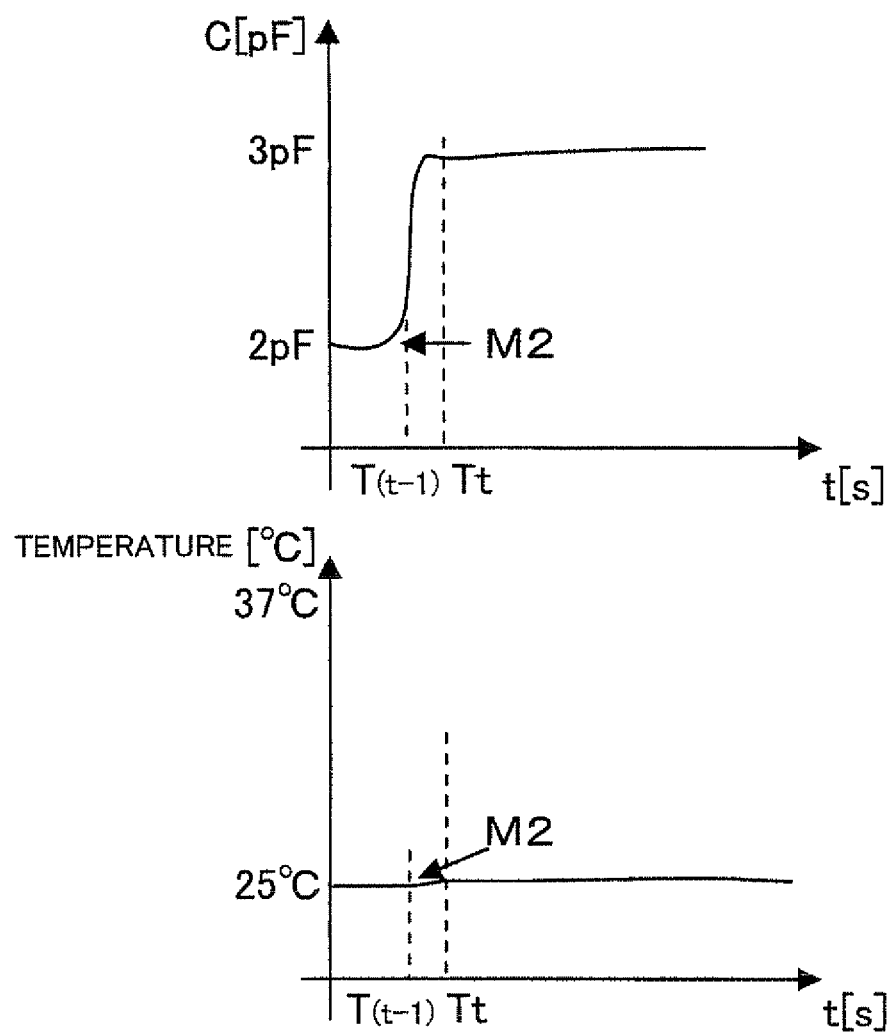
FIG. 14 is a graph showing a relationship between the change in electrostatic capacity and the change in temperature that occur with time in the state where the user holds a probe 3 with a hand or fingers.
Figure 15:
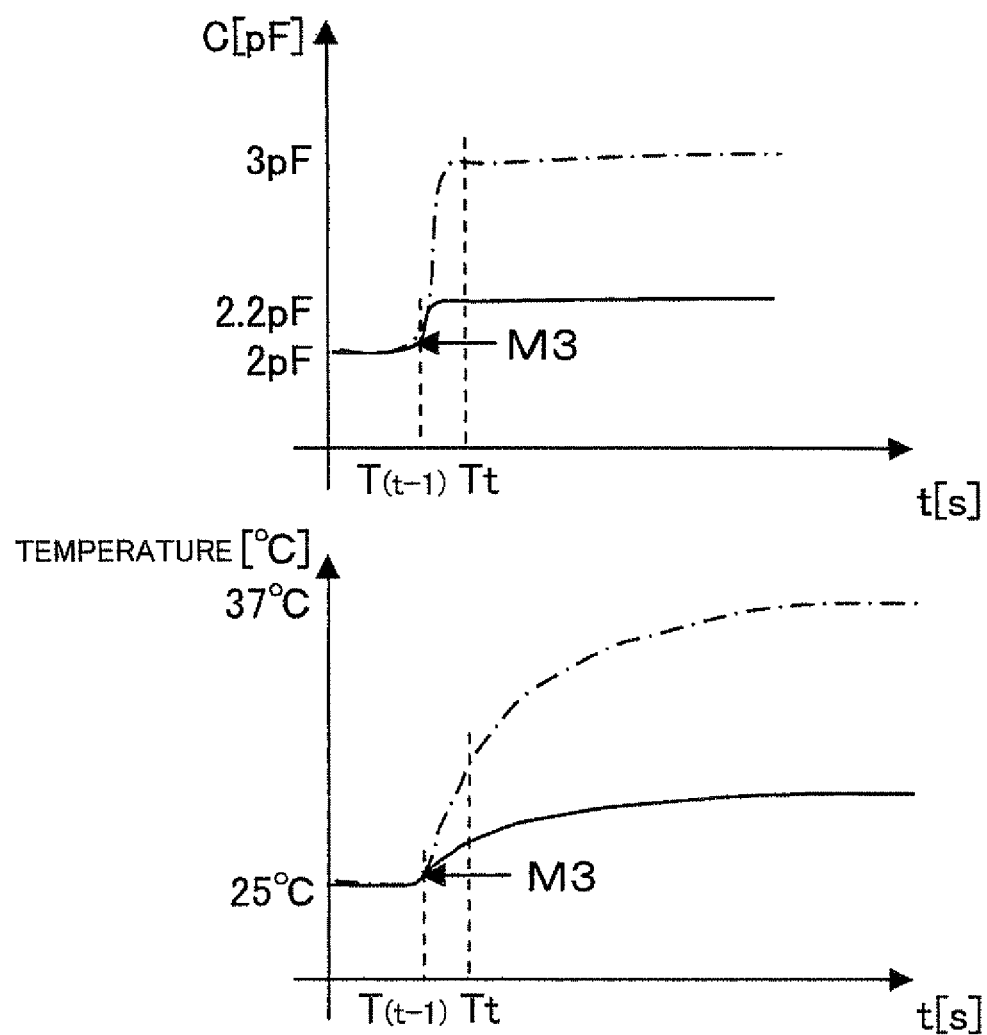
FIG. 15 is a graph showing a relationship between the change in electrostatic capacity and the change in temperature that occur with time in the state where the temperature measuring unit is not in appropriate contact with the measurement target portion.
Figure 16:
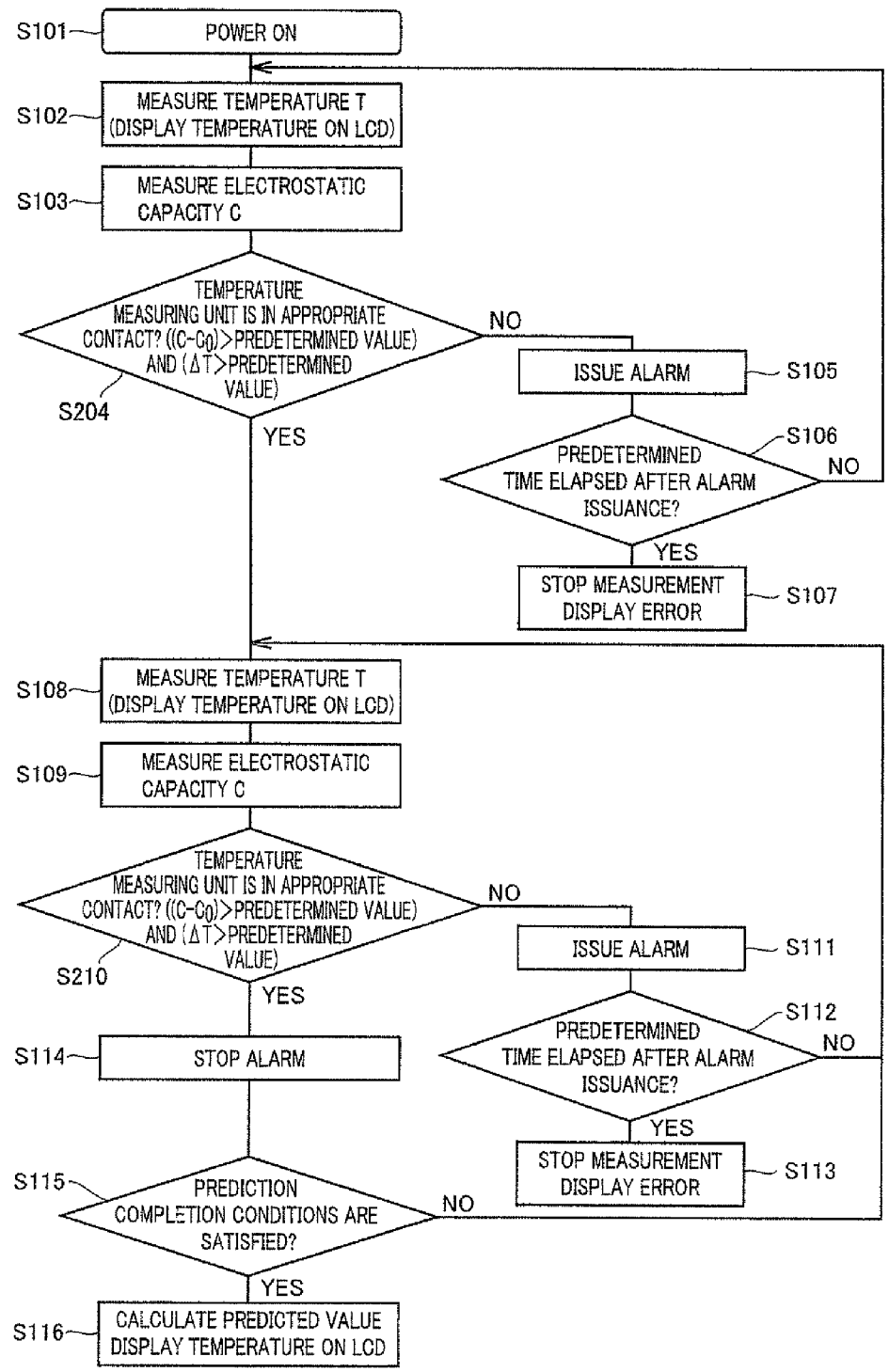
FIG. 16 is a flow chart of temperature measurement by an electronic thermometer according to a fourth embodiment of the invention.

Referring to FIGS. 13 to 16, an electronic thermometer according to a fourth embodiment of the invention will be described below. FIG. 13 is a graph showing a relationship between a change in electrostatic capacity and a change in temperature that occur with time in the state where temperature measuring unit 3a is in appropriate contact with the measurement target portion. FIG. 14 is a graph showing a relationship between the change in electrostatic capacity and the change in temperature that occur with time in the state where the user holds probe 3 with a hand or fingers. FIG. 15 is a graph showing a relationship between the change in electrostatic capacity and the change in temperature that occur with time in the state where temperature measuring unit 3a is not in appropriate contact with the measurement target portion. FIG. 16 is a flow chart of temperature measurement by an electronic thermometer according to this embodiment.

In each of the embodiments already described, when the user unintentionally touches the whole outside area of gap 8 with a hand or finger holding probe 3, the electrostatic capacity of human body contact sensor 7 unpreferably increases similarly to the case where temperature measuring unit 3a is in appropriate contact with the measurement target portion so that a sensing error may occur.

Accordingly, in addition to measuring the electrostatic capacity by human body contact sensor 7, the electronic thermometer according to this embodiment is configured to measure the changes in temperature sensed by temperature sensor 6, and thereby determines whether temperature measuring unit 3a is in appropriate contact with the measurement target portion or not.

More specifically, when the measurement target portion appropriately comes into contact with temperature measuring unit 3a, the electrostatic capacity in human body contact sensor 7 increases, and the temperature sensed by temperature sensor 6 rises as shown in FIG. 13. Therefore, the electronic thermometer is configured to determine that temperature measuring unit 3a is in appropriate contact with the measurement target portion, only when the amount of change in electrostatic capacity exceeds a reference value bringing about the determination that temperature measuring unit 3a is in appropriate contact with the measurement target portion, and the change in temperature measured at this point in time satisfies predetermined conditions bringing about the determination that temperature measuring unit 3a is in appropriate contact with the measurement target portion.

For example, as shown in FIG. 14, when a hand or fingers may hold a portion of the probe near temperature measuring unit 3a, and thereby the amount of change in electrostatic capacity may be equal to the amount of change in electrostatic capacity that occurs when the measurement target portion is in appropriate contact with temperature measuring unit 3a. In this case, if the determination were performed based on only the amount of change in electrostatic capacity, it might be erroneously determined that the measurement target portion was in appropriate contact with temperature measuring unit 3a although the actual contact was inappropriate. However, the temperature sensed by temperature sensor 6 hardly rises unless the hand or finger is in contact with temperature measuring unit 3a, and the temperature rising caused by the contact of the hand or finger is slower than that caused by the contact of the measurement target portion with temperature measuring unit 3a. Therefore, even in the case where the change in electrostatic capacity is larger than the reference value, it is determined that the contact is inappropriate, when the conditions bringing about the determination that the measurement target portion is in appropriate contact with temperature measuring unit 3a are not satisfied. Thereby, the determination error can be prevented. In FIG. 14, M2 indicates an instant at which the user holds a portion of the probe near temperature measuring unit 3a with the hand or fingers.

If it were attempted, using only temperature sensor 6, to determine whether the measurement target portion is in appropriate contact with temperature measuring unit 3a or not, the determination error might occur when temperature measuring unit 3a is not firmly in contact with the measurement target portion, as shown in FIG. 15. Thus, when temperature measuring unit 3a is not firmly in contact with the measurement target portion but the conditions of the temperature rising are satisfied, it is erroneously determined that the measurement target portion is in appropriate contact with temperature measuring unit 3a. However, as shown in FIG. 15, when temperature measuring unit 3a is not firmly in contact with the measurement target portion, the electrostatic capacity does not rise above the reference value. By measuring the electrostatic capacity, therefore, it is possible to determine that temperature measuring unit 3a is not appropriately in contact with the measurement target portion, and the erroneous determination can be prevented. In the figure, M3 represents an instant at which probe 3 is held in the underarm but temperature measuring unit 3a is not appropriately in contact with the measurement target portion.

Referring to FIG. 16, description will be given on a flow of the temperature measurement in the electronic thermometer according to the embodiment. In an example to be described below, the electronic thermometer according to the embodiment is of the prediction type. The same steps as those in the temperature measurement flow (FIG. 6) already described in the first embodiment bear the same numbers, and description thereof is not repeated. The following description will be given on only differences from the temperature measurement flow in FIG. 6.

In each of the embodiments already described, as shown in FIG. 6, the determination about the contact state of temperature measuring unit 3a before the start of the temperature measurement (S104 in FIG. 6) and the determination about the contact state of temperature measuring unit 3a during the temperature measurement (S110 in FIG. 6) are performed based on only the changes in electrostatic capacity. In this embodiment, however, the contact state of temperature measuring unit 3a before and during the temperature measurement is determined, as shown in FIG. 16, based on the change in temperature sensed by temperature sensor 6 in addition to the change in electrostatic capacity (S204 and S210).

Specifically, when a difference (C−C0) between value C of the sensed electrostatic capacity and value C0 of the electrostatic capacity immediately after the power-on is larger than a predetermined value, e.g., of 0.5 pF, and a change ΔT in sensed temperature is larger than a predetermined value, i.e., when a rising rate of the temperature (a gradient of the temperature change in FIGS. 13 to 15) is larger than a reference rising rate from which it is determined that temperature measuring unit 3a is in appropriate contact with the measurement target portion, it is determined that temperature measuring unit 3a is in appropriate contact with the measurement target portion (S204 and S210). These conditions are described merely by way of example, and are not restrictive.

Thereby, even in the case where temperature measuring unit 3a is not in appropriate contact with the measurement target portion, but the amount of change in electrostatic capacity takes the same value as that caused by the appropriate contact of temperature measuring unit 3a, it can be determined that temperature measuring unit 3a is not in appropriate contact, unless the temperature change exhibits the rising rate from which it is determined that temperature measuring unit 3a is in appropriate contact. Likewise, even when the temperature change exhibits the rising rate from which it is determined that temperature measuring unit 3a is in appropriate contact, it is determined that temperature measuring unit 3a is not in appropriate contact, unless the change in electrostatic capacity exceeds the predetermined value from which it is determined that temperature measuring unit 3a is in appropriate contact. Thereby, the determination error can be prevented.

Therefore, the embodiment can suppress occurrence of the erroneous sensing, and can improve the accuracy of the temperature measurement.

Fifth Embodiment

Figure 17:
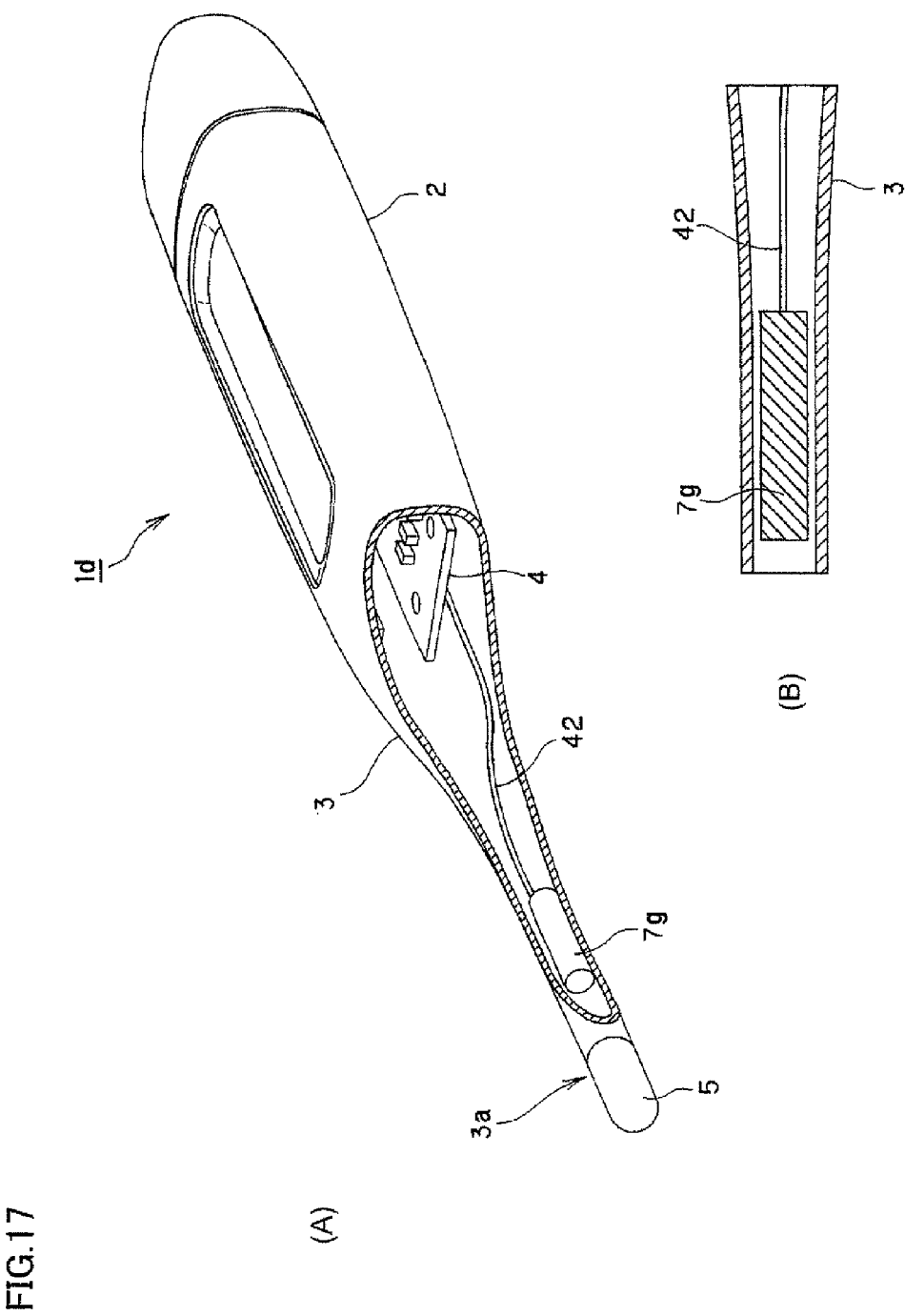
FIGS. 17A and 17B are schematic views showing a distinctive portion of an electronic thermometer according to a fifth embodiment.
Figure 18:
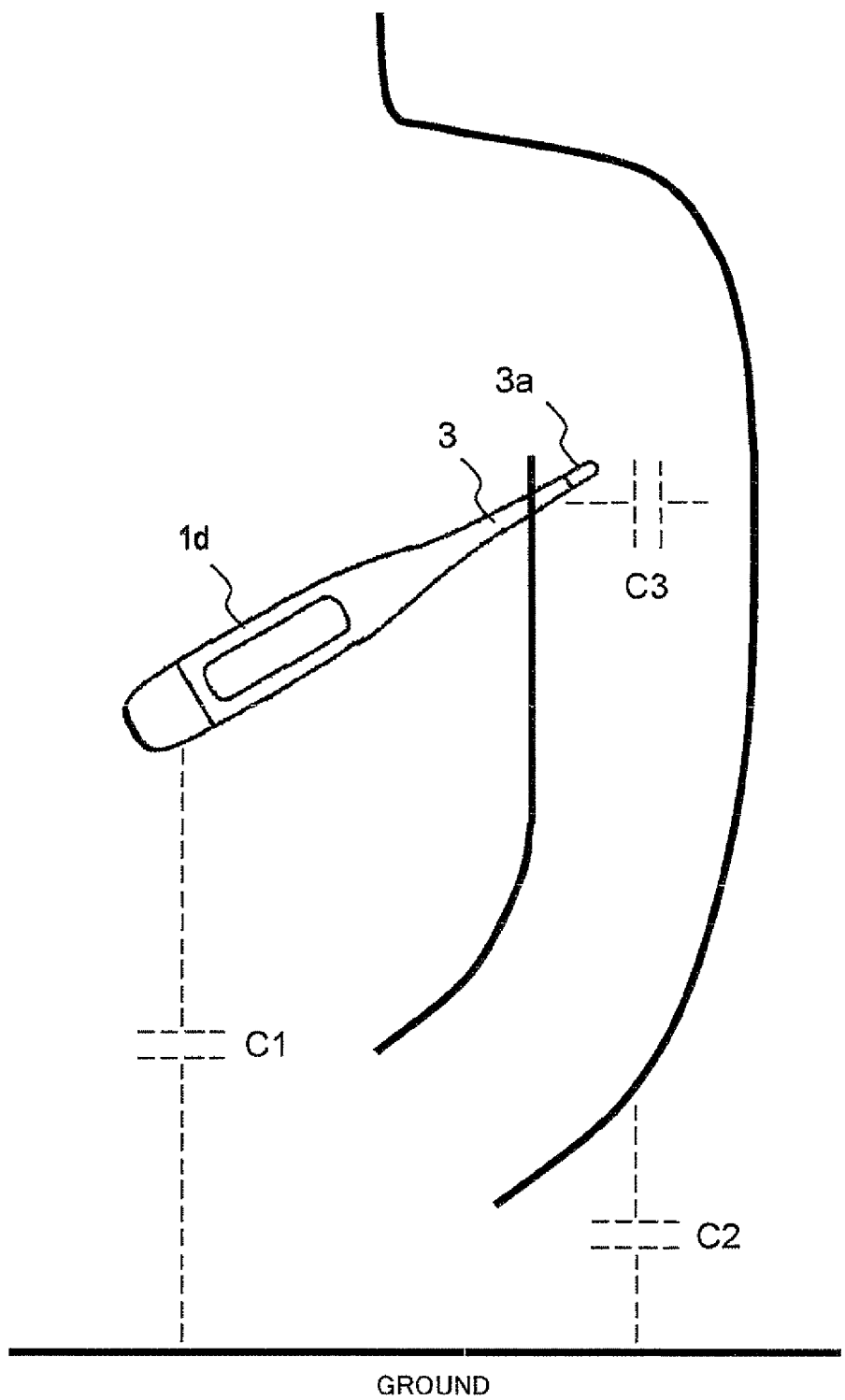
FIG. 18 illustrates a principle of body contact sensing in the fifth embodiment.
Figure 19:
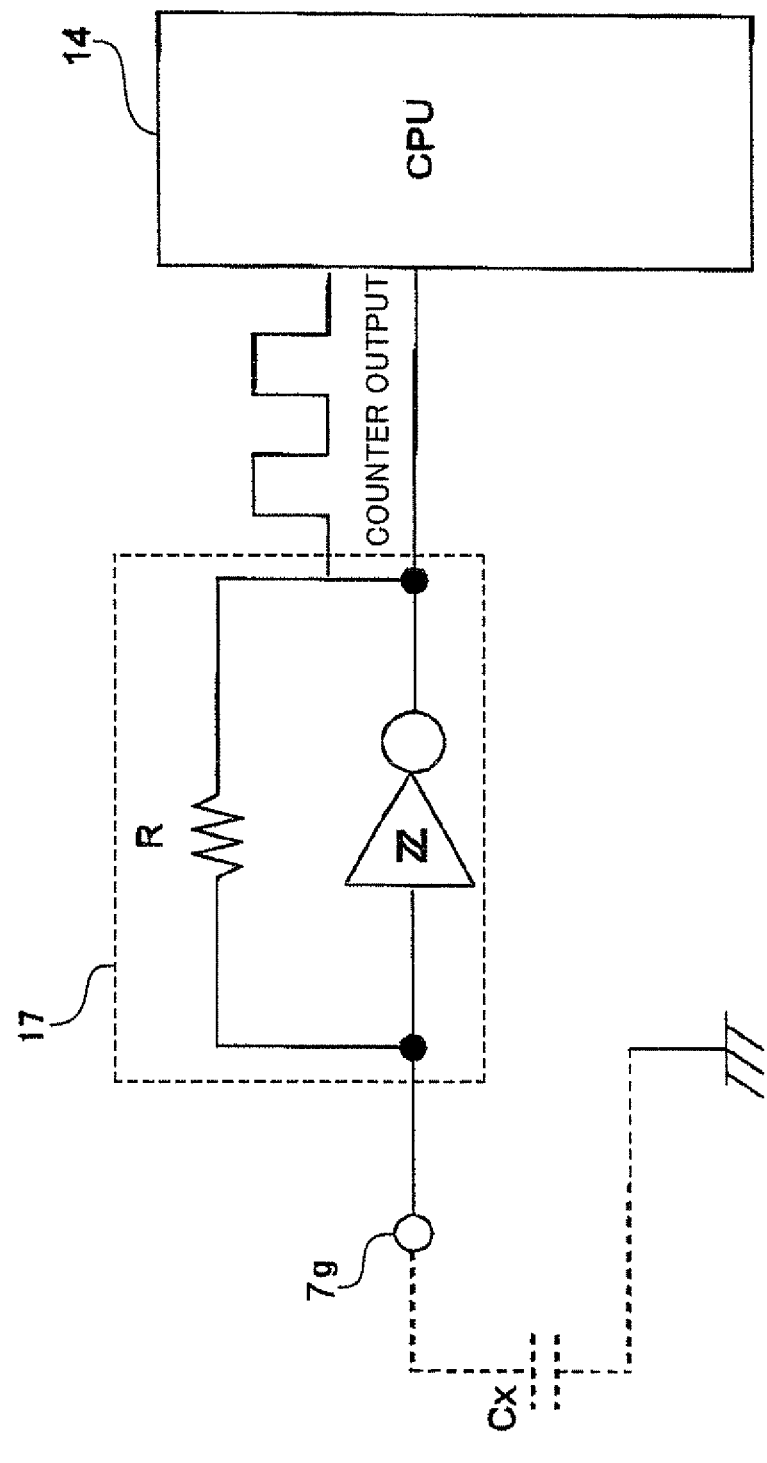
FIG. 19 is a schematic view illustrating a circuit structure of the electronic thermometer according to the fifth embodiment.
Figure 20:
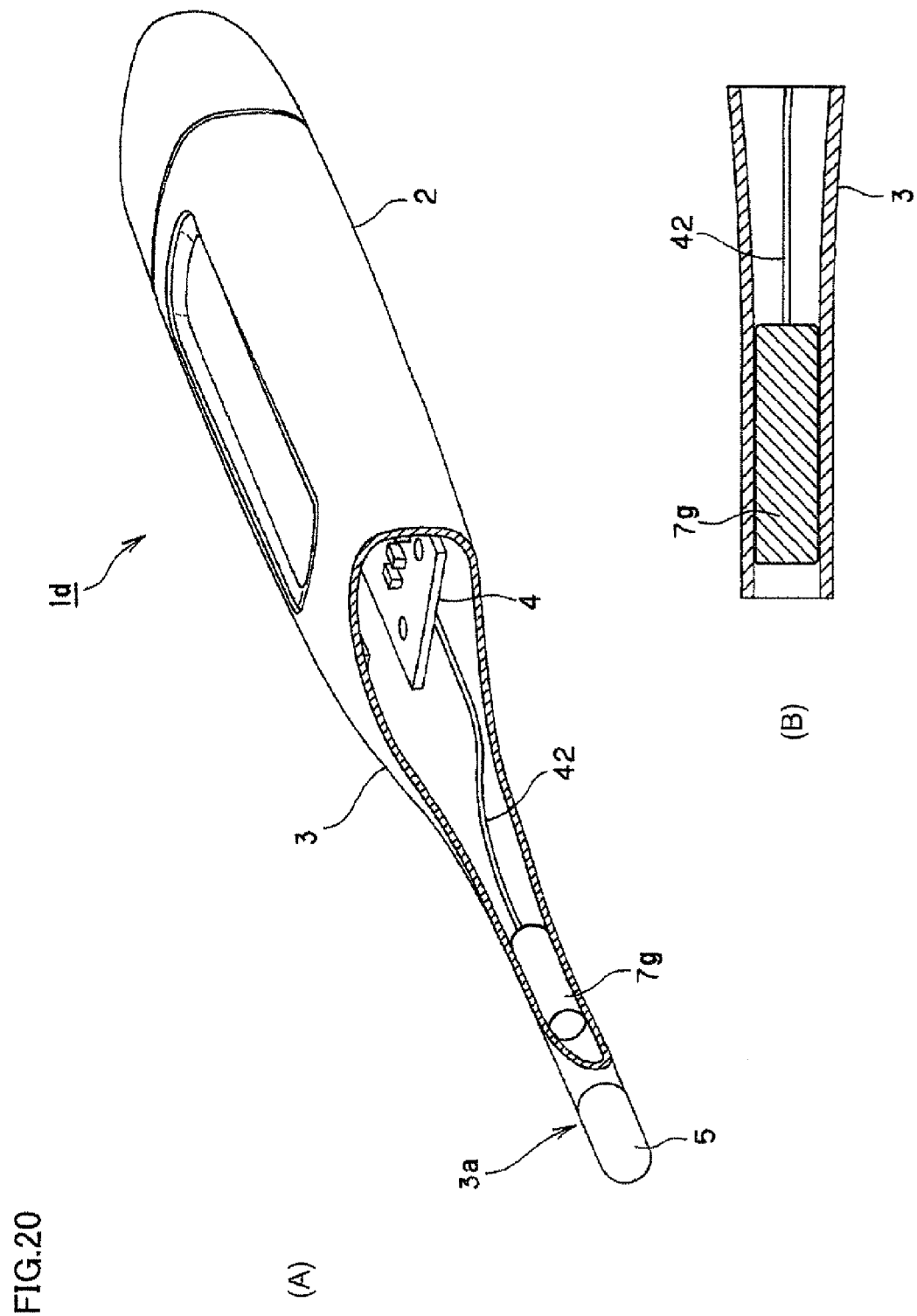
FIGS. 20A and 20B are schematic views showing a specific example of the conductor.

Referring to FIGS. 17A-20B, an electronic thermometer 1d according to a fifth embodiment of the invention will be described below. FIGS. 17A and 17B are schematic views showing a distinctive portion of electronic thermometer 1d according to this embodiment. FIG. 17A is a perspective view of a probe with a certain part cut away, and FIG. 17B is a longitudinal section of the probe. FIG. 18 is a schematic view illustrating a principle of body contact sensing in the fifth embodiment. FIG. 19 is a schematic view illustrating a circuit structure of the electronic thermometer according to the fifth embodiment. FIGS. 20A and 20B are schematic views showing a specific example of the conductor. FIG. 20A is a perspective view of a probe with a certain part cut away, and FIG. 20B is a longitudinal section of the probe. The following description will be given on only differences from the foregoing embodiments. The same members and structures bear the same reference numbers, and description thereof is not repeated. The same members and structures perform or offer substantially the same operations, effects and the like.

As shown in FIGS. 17A and 1713, an electronic thermometer 1d according to the embodiment has human body contact sensor 7 that is formed of one conductor 7g in contrast to the embodiments already described. This conductor 7g serves as one of electrodes forming a capacitor that uses the human body as the other electrode.

Referring to FIG. 18, the principle of the body contact sensing in electronic thermometer 1a according to the embodiment will now be described. When the probe of electronic thermometer 1d is held in the underarm, a circuit shown in the figure is formed between electronic thermometer 1d, the human body and a ground. Electrostatic capacities C1, C2 and C3 are formed between electronic thermometer 1d and the ground, between the human body and the ground, and between the human body and conductor 7g, respectively. A composite capacity Cx in this circuit is represented by (1/Cx=1/C1+1/C2+1/C3). Electrostatic capacity C3 between the human body and conductor 7g increases when the measurement target portion comes into contact with temperature measuring unit 3a.

Each of C1 and C2 is substantially equal to hundreds of microfarads. C3 is equal to several microfarads, and is extremely smaller than C1 and C2, i.e., inter-ground capacities. Each of C1, C2 and C3 is not stable, and changes in response to changes in surrounding environment. However, the change in C3 is extremely smaller than those in C1 and C2. Therefore, the change in C3 extremely predominantly affects the change in composite capacity Cx as compared with the changes in C1 and C2.

Therefore, the embodiment is configured to determine the contact state of the human body by sensing the change in C3 as the change in Cx. This embodiment is configured to sense the change in Cx by a circuit structure shown in FIG. 19. When the human body comes into contact with electrode 7g to change Cx, CR oscillation circuit 17 converts the change in Cx into a frequency so that the change in Cx is sensed as the change in frequency. CR oscillation circuit 17 provides the change in Cx, as a counter output (at an H- or L-level) of an inverter, to CPU 14. This structure is merely an example. A structure sensing the change in Cx is not restricted to this, and another structure that has been known may be used. FIG. 19 shows only a structure for sensing Cx that is a part of the circuit structure of the electronic thermometer, and other structures are substantially the same as those shown in FIG. 4.

This embodiment can sense the contact state by only one electrode, and therefore can simplify the structure of the electronic thermometer.

Naturally, this embodiment can produce substantially the same effect as the embodiment described before. Thus, the conductor is not configured to come into direct contact with the human body. Therefore, a current does not directly flow to the human body through the conductor, and this can suppress the electrical influence that may be directly exerted on the human body. Since the conductor is not externally exposed from the probe, the probe made of resin serves as a protection when static electricity is applied to the thermometer, and can prevent breakage of the inner parts such as a CPU due to the static electricity.

The thermometer senses not only the contact state between the temperature measuring unit and the measurement target portion at the start of the measurement but also the contact state during the measurement, and therefore can always monitor the contact state between the measurement target portion and the temperature measuring unit. Therefore, the embodiment can improve the accuracy of the temperature measurement, and can be used particularly appropriately in the prediction type of thermometer, similarly to the embodiments described before.

Similarly to the embodiments described before, the embodiment measures the change in temperature in addition to the measuring the change in electrostatic capacity, and thereby can improve the accuracy of the temperature measurement by suppressing occurrence of the erroneous sensing.

The specific flow of the temperature measurement in this embodiment is substantially the same as those in the embodiments described before.

For clearly showing the structure of conductor 7g, FIGS. 17A and 17B schematically show as if a gap is present between the outer peripheral surface and the inner surface of probe 3. In practice, however, it is appropriate, as shown in FIGS. 20A and 20B, to keep the outer peripheral surface of conductor 7g in contact with the inner surface of probe 3 without a space therebetween so that a dielectric layer of the air may not be formed between conductor 7g and the human body. For this, conductor 7g may have a form matching the form of the inner peripheral surface of probe 3, and may have, e.g., a circular cylindrical form of which radial size changes as the position moves in the longitudinal direction.

The invention claimed is:

1. An electronic thermometer comprising:
a hollow probe including a temperature measuring unit having a temperature sensor for sensing a temperature at the longitudinal end of said hollow probe;
an electrode arranged in a hollow of said probe without being exposed to an outside of said probe and located near said temperature sensor and said electrode being arranged at a distance in a longitudinal direction of the probe from the position where said temperature sensor is arranged;
a body temperature predict unit for predicting a user's temperature based on the temperature sensed by said temperature sensor of the temperature measuring unit; and
a determining unit for determining whether said temperature measuring unit is in appropriate contact with a measurement target portion of the user or not, based on a change in electrostatic capacity sensed using said electrode and a change in temperature sensed by said temperature sensor.

2. The electronic thermometer according to claim 1, wherein
said electrode is paired electrodes,
said electronic thermometer further comprises a measuring unit for measuring an electrostatic capacity between the paired electrodes, and
said determining unit determines whether said temperature measuring unit is in appropriate contact with the measurement target portion of the user or not, based on a change in electrostatic capacity measured by said measuring unit.

3. The electronic thermometer according to claim 2, wherein
said paired electrodes are a pair of cylindrical conductors aligned to each other in a longitudinal direction of said probe with a space therebetween.

4. The electronic thermometer according to claim 2, wherein
said paired electrodes are a pair of conductors extending spirally in the longitudinal direction of said probe.

5. The electronic thermometer according to claim 2, wherein
said paired electrodes are a pair of semicylindrical conductors arranged symmetrically with respect to an axis extending in the longitudinal direction of said probe.

6. The electronic thermometer according to claim 1, wherein
said determining unit determines whether said temperature measuring unit is in appropriate contact with the measurement target portion of the user or not, based on the change in electrostatic capacity formed between a body of the user and said electrode.

7. The electronic thermometer according to claim 6, further comprising:
a measuring unit for measuring an electrostatic capacity produced by composition of an electrostatic capacity formed between the user's body and said electrode, an electrostatic capacity formed between the electronic thermometer and a ground, and an electrostatic capacity formed between the user's body and the ground, wherein
said determining unit assumes the change in electrostatic capacity measured by said measuring unit as the change in electrostatic capacity formed between the user's body and said electrode, and determines whether said temperature measuring unit is in appropriate contact with the measurement target portion of the user or not.

8. The electronic thermometer according to claim 1, wherein
said electronic thermometer is an electronic thermometer predicting said user's temperature.

9. The electronic thermometer according to claim 1, further comprising:
a notifying unit for providing a notification to the user when said determining unit determines that said temperature measuring unit is not in appropriate contact with the measurement target portion of the user.

10. The electronic thermometer according to claim 9, wherein
said notifying unit includes an LED, and performs notification by a state of turn-on/off of said LED.

11. The electronic thermometer according to claim 9, wherein
said notifying unit includes a buzzer, and said buzzer performs notification by issuing an alarm when a state of contact is inappropriate.

* * * * *